(12) United States Patent
Besinger et al.

(10) Patent No.: US 6,372,107 B1
(45) Date of Patent: Apr. 16, 2002

(54) PROCESS AND CONVEYOR DEVICE FOR CONVEYING VEHICLE BODIES THROUGH A TREATMENT TANK

(75) Inventors: Hartwig Besinger, Erdmannhausen; Klaus Lachenmaier, Leonberg; Gerhard Mogck, Heilbronn, all of (DE)

(73) Assignee: Duerr Systems GmbH, Stuttgart (DE)

( * ) Notice: Subject to any disclaimer, the term of this patent is extended or adjusted under 35 U.S.C. 154(b) by 0 days.

(21) Appl. No.: 09/580,076

(22) Filed: May 30, 2000

(30) Foreign Application Priority Data

Jun. 11, 1999 (DE) .......................................... 199 26 625

(51) Int. Cl.⁷ .............................................. C25D 13/12
(52) U.S. Cl. ........................ 204/479; 204/512; 204/623; 204/625
(58) Field of Search ................................ 204/479, 512, 204/623, 625

(56) References Cited

U.S. PATENT DOCUMENTS

| | | | |
|---|---|---|---|
| 4,668,358 A | 5/1987 | Ball | 204/300 RC |
| 4,904,365 A | 2/1990 | Kawamura | 204/300 RC |
| 5,110,440 A | 5/1992 | Case | |
| 5,556,466 A * | 9/1996 | Martin et al. | 118/67 |
| 5,651,822 A * | 7/1997 | Heckmann | 118/426 |

FOREIGN PATENT DOCUMENTS

| | | |
|---|---|---|
| DE | 36 12 128 | 10/1986 |
| DE | 40 41 211 | 1/1992 |
| DE | 44 32 352 | 3/1996 |
| DE | 196 41 048 | 4/1998 |
| EP | 0 610 947 | 8/1994 |
| GB | 2 229 381 | 9/1990 |

* cited by examiner

Primary Examiner—Kishor Mayekar
(74) Attorney, Agent, or Firm—Barry R. Lipsitz; Douglas M. McAlliste

(57) ABSTRACT

A process for conveying vehicle bodies through a treatment tank for the surface treatment of the vehicle bodies, where the liquid of the treatment tank offers only a slight immersion resistance to the vehicle bodies during immersion and the flow velocities of the liquid relative to the submerging and emerging vehicle bodies are kept low. Prior to their introduction into the treatment tank the vehicle bodies are transferred from a standard position, in which window openings of each vehicle body are arranged above the floor pan of the vehicle body, into a headfirst position, in which the window openings of each vehicle body are arranged beneath the floor pan of the vehicle body. The vehicle bodies are subsequently introduced into the treatment tank in the headfirst position, conveyed through the treatment tank and brought out of the treatment tank again in the headfirst position.

45 Claims, 31 Drawing Sheets

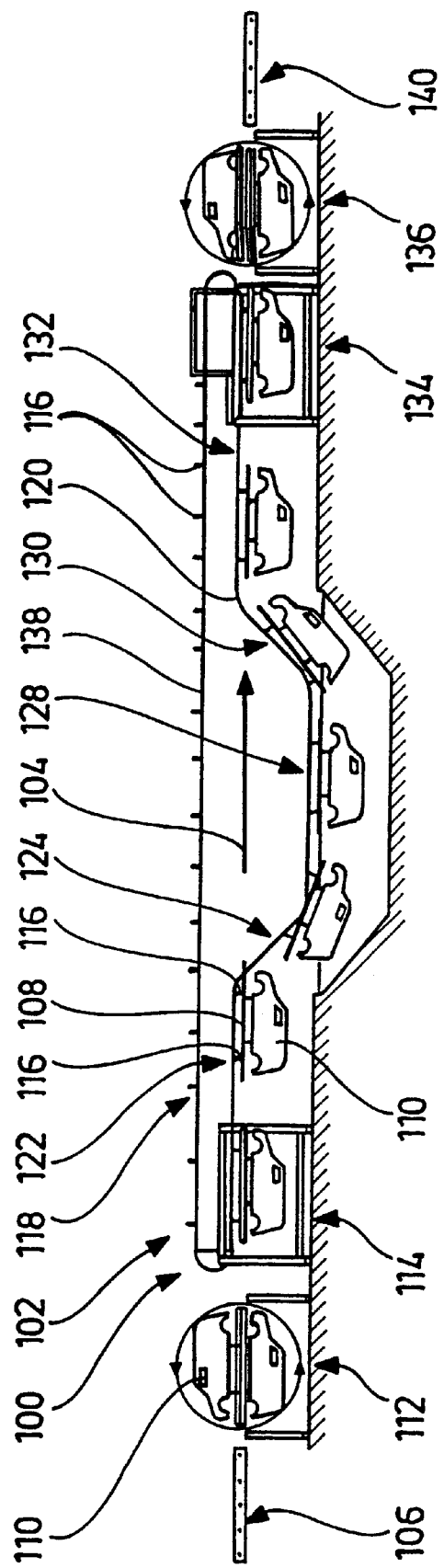

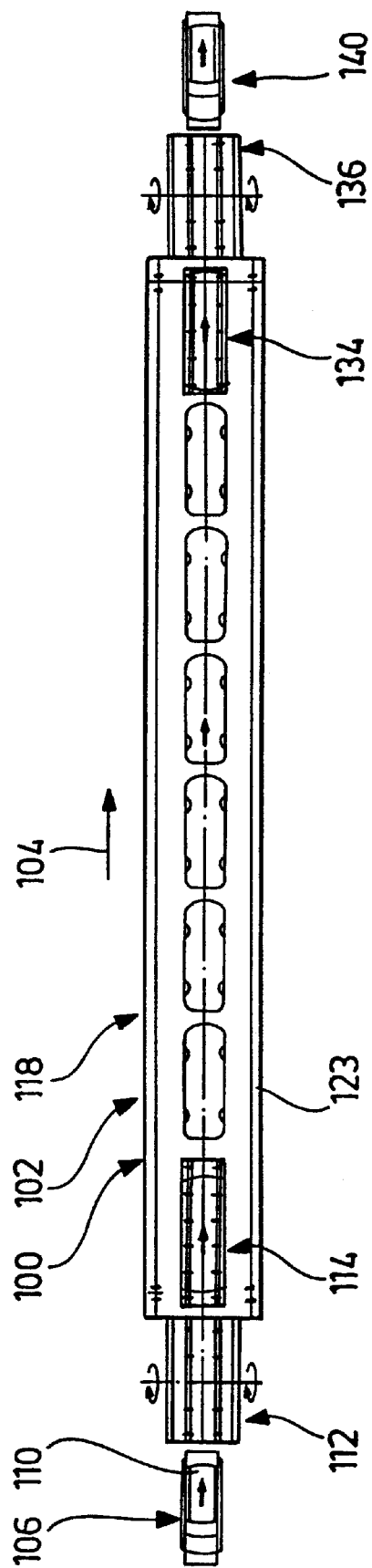

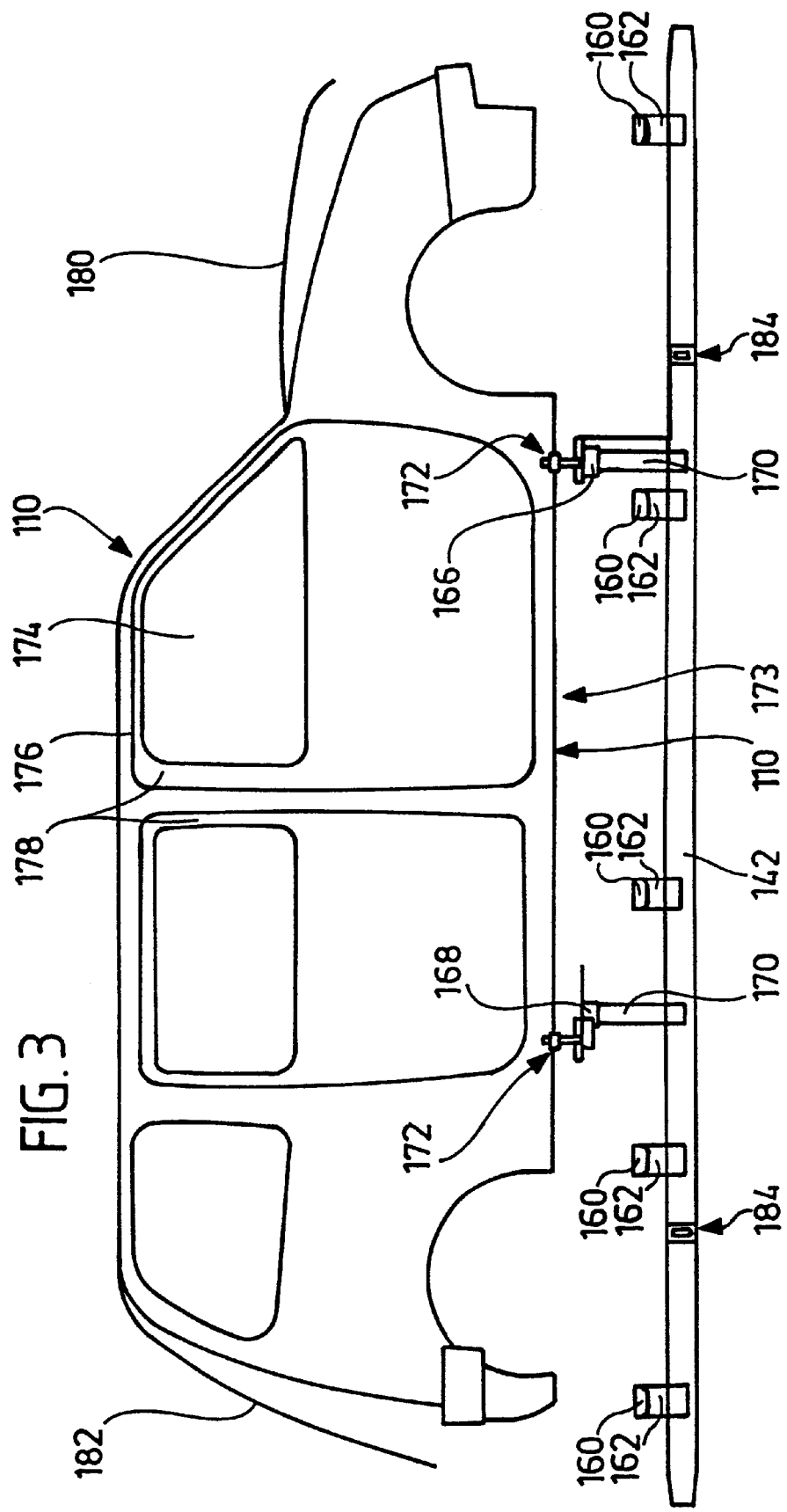

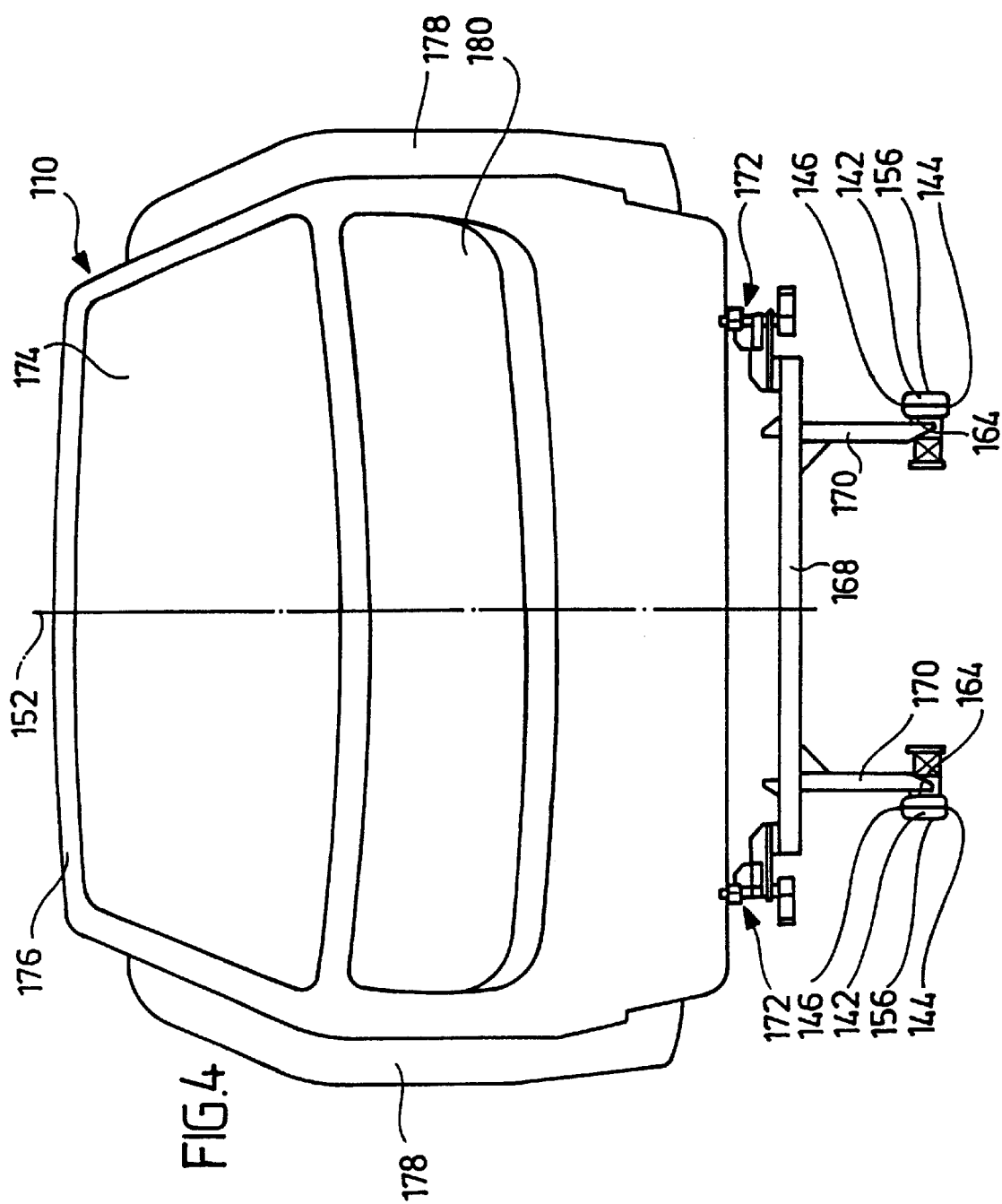

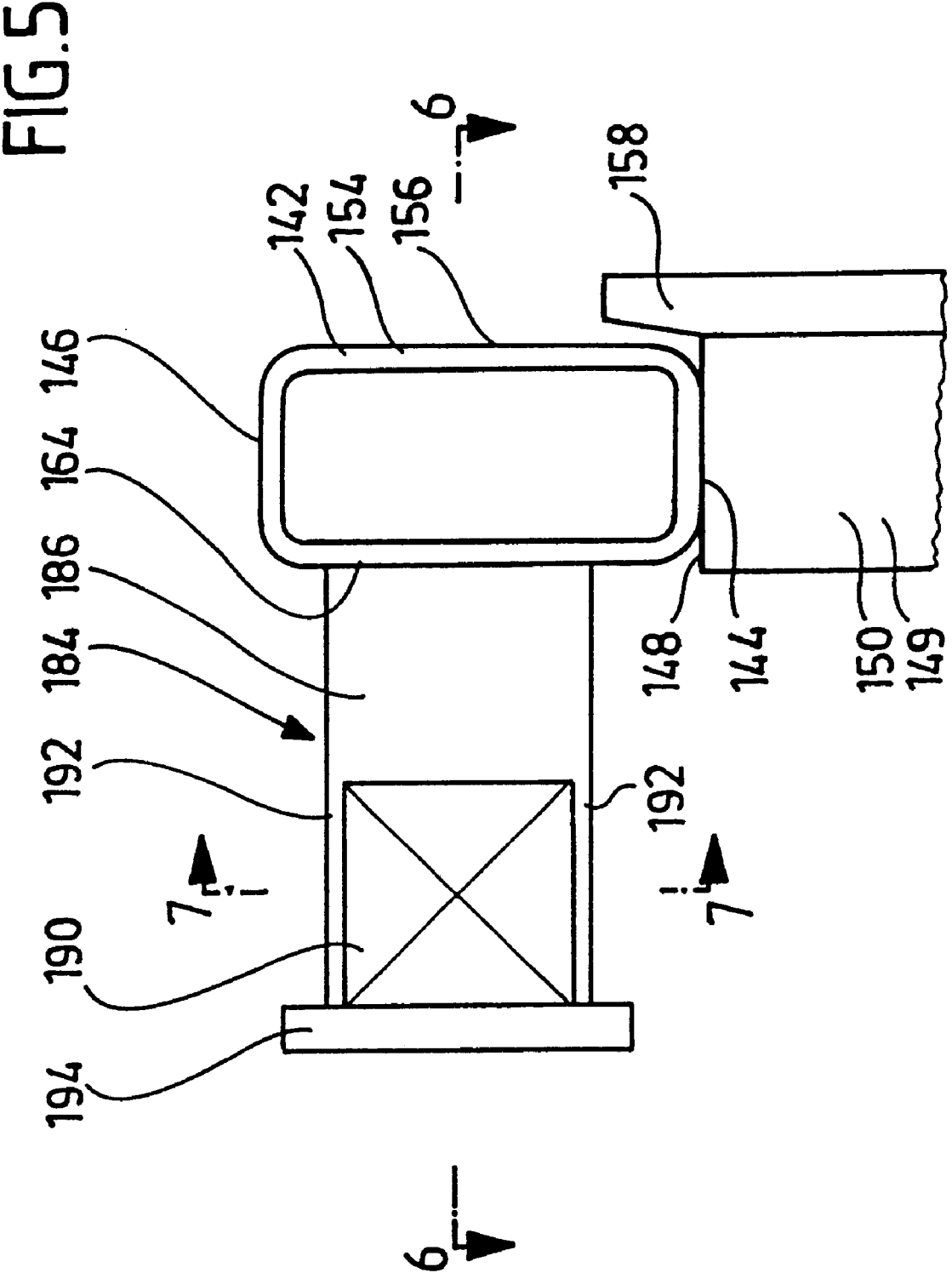

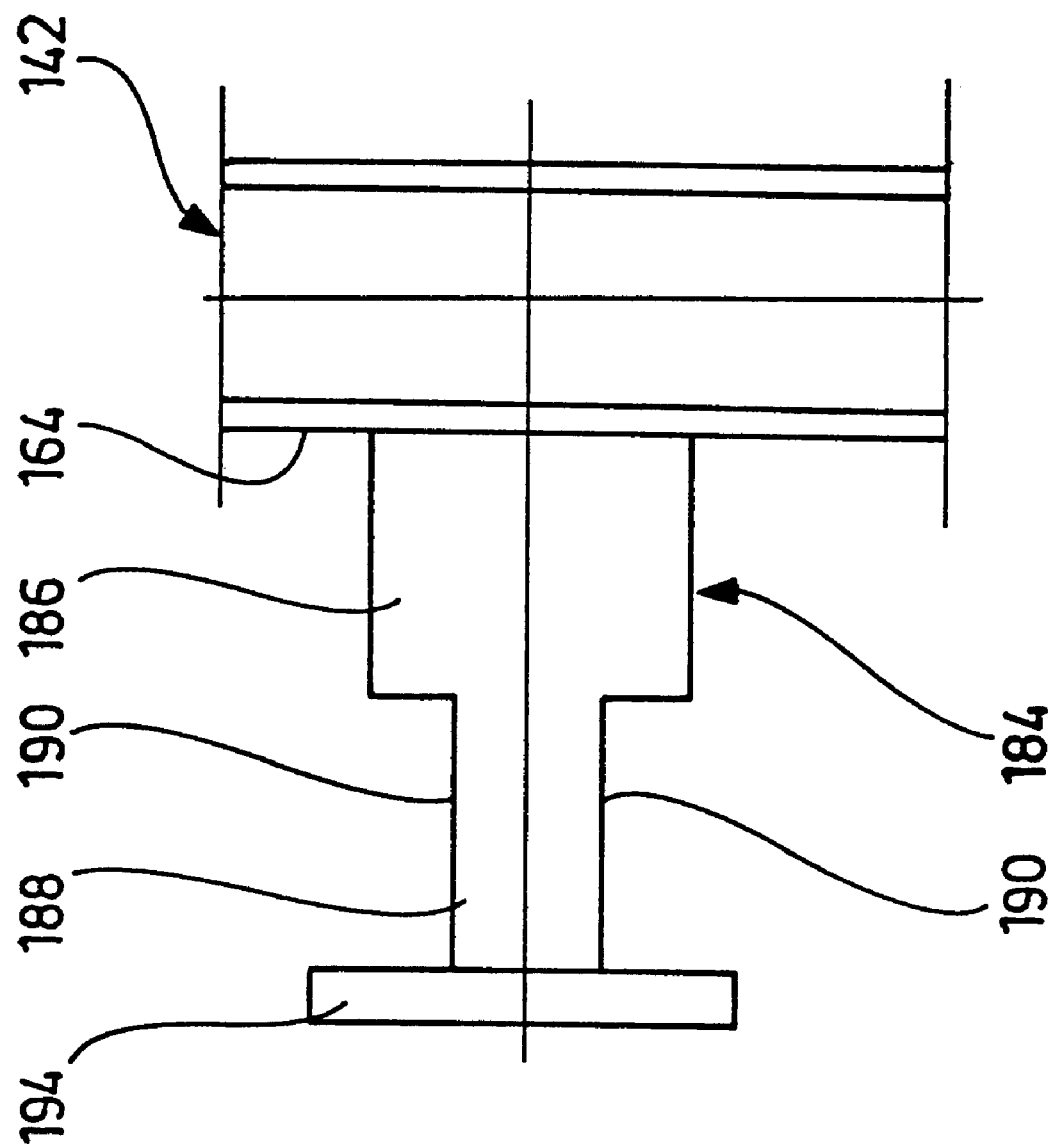

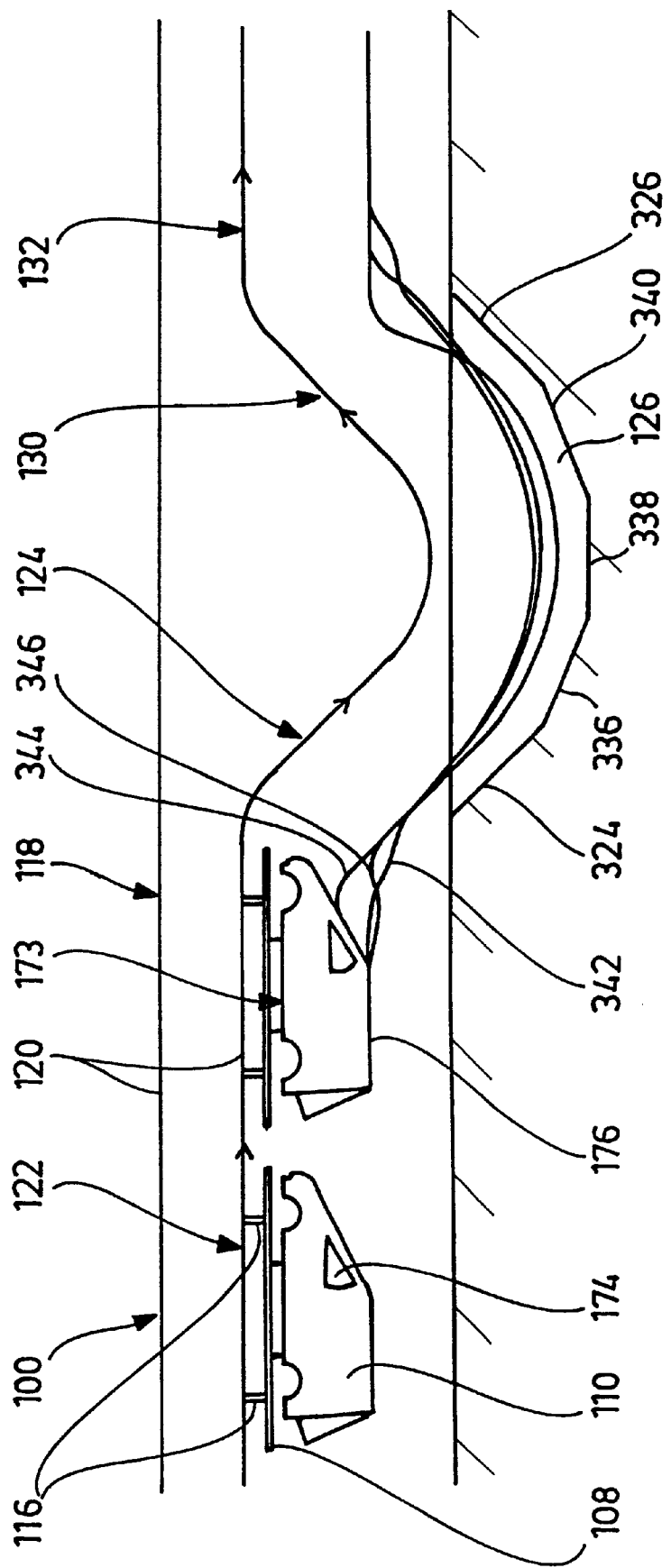

PROCESS AND CONVEYOR DEVICE FOR CONVEYING VEHICLE BODIES THROUGH A TREATMENT TANK

BACKGROUND OF THE INVENTION

The present invention relates to a process for conveying vehicle bodies through a treatment tank for the surface treatment of the vehicle bodies.

Furthermore, the present invention relates to a conveyor device for conveying vehicle bodies through a treatment tank for the surface treatment of the vehicle bodies, comprising a conveyor which introduces the vehicle bodies into the treatment tank, conveys them through the treatment tank and brings them out of the treatment tank again.

Such a process and such a device are known, for example, from DE 36 12 128 A1. With the process known from this publication, the vehicle bodies mounted on support carriages (designated in the following as skid frames) are suspended on a conveyor line, with which the vehicle bodies are conveyed through a phosphating and painting plant, with the aid of oscillatingly suspended pairs of support elements which are each formed from two L-shaped arms located opposite one another.

The vehicle bodies are immersed in the phosphating and painting bath by the pairs of support elements with the vehicle bodies suspended therefrom being conveyed along an inclined conveyor section of the conveyor line into the relevant treatment tank. In this respect, a floor pan of the respective vehicle body is first immersed in the treatment tank. Since the floor pan of a vehicle body offers the liquid from the treatment tank only small entry cross sections for penetrating into the interior of the vehicle body, a high counterpressure (immersion resistance) must be overcome when the vehicle body is immersed in the treatment tank.

Furthermore, as the vehicle body is emerging from the treatment tank the floor pan of the vehicle body leaves the treatment tank last. In this respect, it is possible that the liquid of the treatment tank will run only incompletely out of the interior of the vehicle body or irritating markings will remain when the liquid runs out after leaving the treatment tank.

Furthermore, a process and a device are known from DE 196 41 048 A1, with which vehicle bodies are immersed in the treatment tank due to superposition of a translatory movement and a rotary movement at the beginning of a treatment tank and at the end of the treatment tank are moved out of the treatment tank by a like superposition of translatory and rotary movements. On account of the superposition of the translatory movement of the vehicle bodies with a rotary movement at the beginning and at the end of the treatment tank, the depth of the treatment tank must be selected to be larger than is required for the process according to DE 36 12 128 A1. Moreover, higher flow velocities of the liquid of the treatment tank result relative to the submerging or emerging vehicle body due to the superposition of the translatory and the rotary movements which leads to a greater mechanical load on the vehicle body and its holder. In particular, holding elements provided on the vehicle body, as a result of which doors, hood and trunk lid or tailgate of the vehicle body are kept in a slightly opened state during the surface treatment, have to be of a more stable design.

SUMMARY OR THE INVENTION

The object underlying the present invention is therefore to provide a process of the type specified at the outset, with which the liquid of the treatment tank offers only a slight immersion resistance to the vehicle bodies during immersion and the flow velocities of the liquid of the treatment tank relative to the submerging and emerging vehicle bodies are kept low.

This object is accomplished in accordance with the invention, in a process for conveying vehicle bodies through a treatment tank for the surface treatment of the vehicle bodies, in that prior to their introduction into the treatment tank the vehicle bodies are transferred from a standard position, in which window openings of the respective vehicle body are arranged above the floor pan of the vehicle body, into a headfirst position, in which the window openings of the respective vehicle body are arranged beneath the floor pan of the vehicle body, and that the vehicle bodies are subsequently introduced into the treatment tank, conveyed through the treatment tank and brought out of the treatment tank again in the headfirst position.

As a result of the inventive idea, the immersion resistance offered to the vehicle body during immersion is considerably reduced since the window openings of the vehicle body, which offer the liquid of the treatment tank large entry cross sections for penetrating into the interior of the vehicle body, are immersed in the treatment tank earlier than is the case when the vehicle bodies are introduced in the standard position.

Moreover, no increased flow velocities of the liquid of the treatment tank relative to a submerging or emerging vehicle body occur since the vehicle body is already transferred into the headfirst position before being introduced into the treatment tank. For the same reason the depth of the treatment tank need also not be increased.

When the vehicle bodies are brought out of the treatment tank in the headfirst position, the liquid which has penetrated the interior of the vehicle bodies can run off completely and free from markings through the window openings.

Furthermore, as a result of the fact that during its transport through the treatment tank the roof of the vehicle body hangs downwards no air bubbles or foam can collect underneath the roof, as is frequently the case when a vehicle body is conveyed through a treatment tank in a standard position. On the contrary, such air bubbles and foam can escape upwards out of the interior of the vehicle body through outlet openings in the floor area of the vehicle body when a vehicle body is conveyed through the treatment tank in a headfirst position. As a result, it is possible to avoid parts of the vehicle body not coming into contact with the liquid of the treatment tank on account of air bubbles or the formation of foam and thus not being subjected to the desired treatment, i.e., for example, cleaned, degreased or painted.

Furthermore, when the vehicle bodies are transported through the treatment tank in a headfirst position the roof and the hood hang downwards and so no dirt from the treatment tank can be deposited on these particularly critical, visible surfaces of the vehicle body. As a result, treatment errors, for example, paint errors on account of sedimented dirt particles are avoided, in particular, on the extended, horizontal visible surfaces of the vehicle body.

Finally, the immersion contour of a vehicle body introduced into the treatment tank in a headfirst position differs from the immersion contour of a vehicle body introduced in a standard position which can—as a function of the shape of the vehicle body and the predetermined minimum immersion time—result in the treatment tank of the inventive process being of a shorter design than with a process, with which the vehicle bodies are introduced into the treatment tank in the standard position.

Such a shortening of the treatment tank is possible, in particular, with short immersion times.

Once the vehicle bodies have been brought out of the treatment tank they can be returned to the standard position in order to carry out a further step in the production process of the vehicle, for example, the assembly of additional components on the vehicle body which is normally carried out in the standard position of the vehicle body.

It is, however, in no way necessary to return the vehicle body to the standard position after each passage through a treatment tank. On the contrary, it is possible to convey the vehicle bodies in the headfirst position through several treatment areas arranged one behind the other, for example, pretreatment areas, painting areas and drying areas and not return the vehicle bodies to the standard position until after the last of these treatment sections.

In principle, the orientation of the vehicle body relative to the direction of conveyance in the headfirst position is optional in the inventive process as long as the window openings of the respective vehicle body are arranged beneath the floor pan of the vehicle body.

It may, for example, be provided for the windshield openings of the vehicle bodies to point rearwards in the direction of conveyance in the headfirst position of the vehicle bodies.

A particularly low immersion resistance is, however, achieved when it is advantageously provided for the windshield openings of the vehicle bodies to point forwards in the direction of conveyance in the headfirst position of the vehicle bodies.

In a preferred development of the inventive process, the vehicle bodies are transferred from the standard position into the headfirst position by means of a rotation, preferably by means of a rotation through approximately 180°.

In principle, such a rotation can take place about any optional horizontal axis of rotation.

It is, however, advantageously provided for the vehicle bodies to be transferred from the standard position into the headfirst position by means of a rotation about an axis of rotation aligned essentially at right angles to the direction of conveyance. With such an orientation of the axis of rotation, the bearing and drive elements required for carrying out the rotation can be arranged to the side next to the path of conveyance of the vehicle bodies without hindering the conveyance of the vehicle bodies along the direction of conveyance.

In principle, it could be provided for the vehicle bodies to be arranged directly on a conveyor which conveys the same through the treatment tank.

However, a development of the inventive process is preferred, with which the vehicle bodies are each arranged on a skid frame.

A "skid frame" is thereby to be understood as any transport means for a workpiece which comprises at least two skid runners which are arranged at a distance from one another transversely to the direction of transport of the workpieces, wherein each skid runner has a contact surface for supporting the transport means on an essentially flat supporting surface of a roller conveyor.

The skid runners of the skid frame may be mounted directly on the workpiece so that the workpiece itself undertakes the connection of the skid runners with one another.

However, crossbars are customarily provided which are connected to each of the skid runners by supports in order to connect the skid runners of the skid frame rigidly to one another.

The supporting surface of a roller conveyor is defined by the apex lines of the support members of the roller conveyor and corresponds to the common tangential plane of the cylindrical support members of the support rollers of the roller conveyor.

A vehicle body arranged on such a skid frame can thus be conveyed horizontally by means of roller conveyors in a simple manner.

Moreover, in this case suspension and/or entrainment devices, which are required for transporting the vehicle body with other conveyor devices, can be arranged on the skid frame.

It is advantageously provided for the skid frames to be arranged above the vehicle bodies in the headfirst position so that the skid frames can be connected to the floor pan of the respective vehicle body in the customary manner by means of suitable locking elements.

It is particularly favorable when skid frames are used, the skid runners of which each have two contact surfaces facing away from one another for supporting the skid frame on an essentially flat supporting surface of a roller conveyor. This makes it possible to support the skid frame on the supporting surface of a roller conveyor with the contact surface pointing respectively downwards and thus to convey the skid frame horizontally by means of this roller conveyor not only in a first position, in which the vehicle body arranged on the skid frame is in the standard position, but also in a second position, in which the vehicle body arranged on the skid frame is in the headfirst position.

The presence of two differently oriented contact surfaces on the skid runners of the skid frame is also of advantage during the transfer of the vehicle bodies from the standard position into the headfirst position.

It may, in particular, be provided for both contact surfaces of the skid runners to abut on a respective, essentially flat supporting surface of a turning device during the transfer of the vehicle bodies from the standard position into the headfirst position by means of the turning device. As a result, a particularly reliable securing of the skid frame and the vehicle body arranged thereon against any movement at right angles to these supporting surfaces during the transfer from the standard position into the headfirst position is ensured.

In principle, the essentially flat supporting surfaces of the turning device can, for example, be formed by holding-down devices with holding-down surfaces extending tangentially to the respective supporting surface.

It is, however, of advantage when at least one of the supporting surfaces of the turning device is designed as a common tangential plane of the support members of the support rollers of a roller conveyor. In this case, the skid frame with the vehicle body arranged thereon can, for example, be conveyed onto the relevant supporting surface of the turning device by means of this roller conveyor prior to the rotation.

It is particularly favorable when both supporting surfaces of the turning device are each designed as a common tangential plane of the support members of the support rollers of a respective roller conveyor. In this case the skid frame with the vehicle body arranged thereon can be conveyed onto the first supporting surface of the turning device by means of the first of these roller conveyors prior to the rotation and after the rotation can be conveyed by means of the second roller conveyor away from the second supporting surface of the turning device and out of the turning device.

In order to prevent the skid runners of the skid frame from being treated, for example, painted as well in the treatment tank and therefore having to be cleaned after a few passages through the treatment tank, it is advantageously provided for the skid runners of the skid frame to be conveyed over the treatment tank above the level of the treatment tank and thus not to come into contact with the liquid in the treatment tank.

In a preferred development of the inventive process it is provided for the vehicle bodies to be conveyed through the treatment tank suspended on a pendulum conveyor.

It may be provided, in particular, for the vehicle bodies to be suspended in the pendulums of the pendulum conveyor in the headfirst position.

In this case, a customary pendulum conveyor such as that known, for example, from DE 36 12 128 A1 can be used to convey the vehicle bodies through the treatment tank without this pendulum conveyor needing to be provided with any additional means for transferring the vehicle bodies from the standard position into the headfirst position.

The pendulum conveyor to be used can, however, also be adapted to the special features of the inventive process in an advantageous manner.

For example, it is, in particular, of advantage when it is provided for the pendulums of the pendulum conveyor to be arranged completely above the vehicle bodies suspended on the pendulums. In this case, the pendulums of the pendulum conveyor, in contrast to customary pendulum conveyors such as the pendulum conveyor known, for example, from DE 36 12 128 A1, do not engage around the vehicle bodies suspended on the pendulum conveyor and so no additional space need be provided for accommodating the pendulums in the treatment tank to the side next to the vehicle bodies and beneath the vehicle bodies. The width and the depth of the treatment tank can therefore be selected to be smaller than with a customary pendulum conveyor and so the treatment tank can be accommodated in a more space-saving manner and the amount of liquid needed to fill the treatment tank is reduced.

If the treatment tank is an electrophoretic coating bath, a more uniform coating of the vehicle body will be achieved as a result of the fact that the pendulums of the pendulum conveyor are arranged completely above the vehicle bodies suspended on the pendulums since the pendulums, in contrast to customary pendulum conveyors, are not located in the space between the anodes and the body. There is, therefore, no area of the body "shaded" by the pendulums, in which the coating has a smaller layer thickness.

Furthermore, it is favorable when the pendulums of the pendulum conveyor are conveyed over the treatment tank above the level of the treatment tank. In this case the pendulums of the pendulum conveyor do not come into contact with the liquid of the treatment tank and are not treated, for example, painted as well and so it is not necessary to clean the pendulums after a few cycles by the pendulum conveyor.

There are numerous possibilities for the design of the pendulum conveyor.

For example, it may be provided for the pendulums of the pendulum conveyor to be conveyed by means of a one-strand conveyor means, wherein the conveyor means can be arranged, for example, centrally above the treatment tank.

Alternatively thereto, it is also possible for the pendulums of the pendulum conveyor to be conveyed by means of a two-strand conveyor means.

In this case, the guideways for the conveyor means can be arranged directly over the treatment tank in order to keep the width of a booth, in which the treatment tank is arranged, as small as possible.

In this case it can, however, also be provided for guideways for the conveyor means to be arranged above the treatment tank and to the side next to it so that abrasion particles generated at the guideways for the conveyor means are prevented from falling downwards into the treatment tank and/or onto the vehicle bodies conveyed through the treatment tank.

In order to protect the conveyor means and the guideways for the conveyor means from contact with aggressive chemical substances from the treatment tank, it is of advantage when each strand of the conveyor means is arranged in a respective closed conveyor means channel.

In order to prevent aggressive chemical substances from penetrating the interior of the conveyor means channel it is favorable when the interior of the conveyor means channel is maintained at an increased air pressure in comparison with the interior of the booth containing the treatment tank.

The treatment tank, through which the vehicle bodies are conveyed in the headfirst position, may, for example, be a cleaning, degreasing, phosphating or painting bath.

When the treatment tank is an electrophoretic painting bath, sill anodes arranged above the path of the vehicle bodies are advantageously used in the treatment tank in order to achieve an adequate coating thickness in the area of the sill panels of the floor pan of the vehicle bodies. Since the vehicle bodies are conveyed through the treatment tank in a headfirst position, the sill anodes may be arranged above in the path of the vehicle bodies close to the level of the treatment tank where they are accessible for maintenance purposes without the liquid needing to be drained from the treatment tank.

A further object underlying the present invention is to provide a conveyor device of the type specified at the outset which makes it possible to introduce the vehicle bodies into the treatment tank with low immersion resistance without increased flow velocities of the liquid of the treatment tank relative to the submerging or emerging vehicle bodies occurring.

This object is accomplished in accordance with the invention, in a conveyor device for the surface treatment of vehicle bodies, in that the conveyor device comprises a transfer device which transfers the vehicle bodies prior to their introduction into the treatment tank from a standard position, in which window openings of the respective vehicle body are arranged above the floor pan of the vehicle body, into a headfirst position, in which the window openings of the respective vehicle body are arranged beneath the floor pan of the vehicle body, and that the conveyor of the conveyor device subsequently introduces the vehicle bodies into the treatment tank, conveys them through the treatment tank and brings them out of the treatment tank again in the headfirst position.

Special developments of the inventive conveyor device are provided which correspond to the subject matter of the invention process, the advantages of which have already been discussed above.

A treatment device for the surface treatment of vehicle bodies is also provided which comprises a treatment tank for the surface treatment of the vehicle bodies and an inventive conveyor device for conveying vehicle bodies through the treatment tank.

Additional features and advantages of the invention are the subject matter of the following description and drawings illustrating embodiments.

BRIEF DESCRIPTION OF THE DRAWINGS

FIG. 1 shows a schematic side view of a conveyor device with an entry roller conveyor, entry turning device, entry lifting station, a pendulum conveyor, exit lifting station, exit turning device and exit roller conveyor;

FIG. 2 shows a schematic plan view of the conveyor device from FIG. 1;

FIG. 3 shows a schematic side view of a vehicle body arranged on a skid frame;

FIG. 4 shows a schematic front view of a vehicle body arranged on a skid frame;

FIG. 5 shows a partially cutaway view of a skid runner and a suspension area of the skid frame from FIGS. 3 to 4A arranged thereon;

FIG. 6 shows a section through the skid runner and the suspension area of the skid frame along line 6—6 in FIG. 5;

FIG. 30 shows a schematic side view of a pendulum conveyor and a shortened treatment tank.

DETAILED DESCRIPTION OF THE INVENTION

Figure 4A:
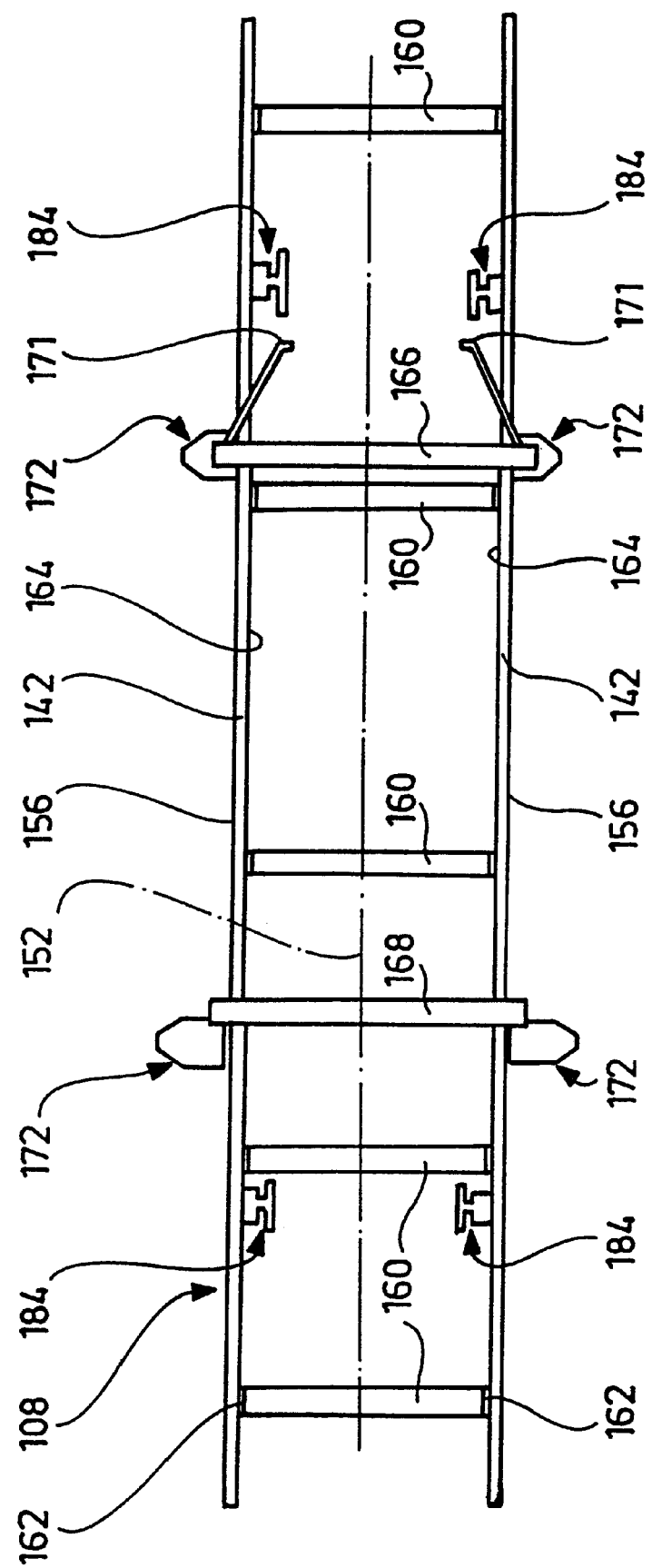
FIG. 4A shows a schematic plan view of the skid frame from FIGS. 3 and 4.

The same or functionally equivalent elements are designated with the same reference numerals in all the Figures.

A treatment device for vehicle bodies illustrated in FIGS. 1 to 26 and 29 and designated as a whole as 100 comprises a conveyor device for conveying vehicle bodies which is illustrated schematically in FIGS. 1 and 2 and designated as a whole as 102.

The conveyor device 102 comprises the following components, following one another in the direction of conveyance 104: a roller conveyor 106 on the entry side for the horizontal transport of vehicle bodies 110 arranged on skid frames 108 along the direction of conveyance 104, i.e. to the right in the illustration of FIGS. 1 and 2, wherein the vehicle bodies 110 are in a standard position, in which window openings of the vehicle bodies 110 are arranged above the floor pan of the vehicle bodies 110.

In the direction of conveyance 104 the roller conveyor 106 on the entry side is adjoined by a turning device 112 on the entry side which serves to transfer the vehicle bodies 110, due to rotation through 180°, into a headfirst position, in which window openings of the vehicle bodies 110 are arranged beneath the floor pan of the vehicle bodies 110.

Along the direction of conveyance 104 the turning device 112 on the entry side is adjoined by a lifting station 114 on the entry side, in which the skid frames 108 with the vehicle bodies 110 arranged thereon are suspended in pendulums 116 of a pendulum conveyor designated as a whole as 118. The pendulums 116 are connected in a manner to be described in greater detail in the following to an endless circulating conveyor means 120 of the pendulum conveyor 118 which is driven in a manner known per se and thus not described here in greater detail and transports the pendulums 116 with the skid frames 108 suspended on them along the direction of conveyance 104 through a booth 123 (FIG. 2).

As is apparent from FIG. 1, the pendulum conveyor 118 has a horizontal inlet section 122 on the entry side, in which the vehicle bodies 110 are transported horizontally in a headfirst position, an inclined immersion section 124 adjoining thereto, in which the vehicle bodies are conveyed at an angle downwards into a treatment tank 126 in a headfirst position at an angle of inclination of approximately 45°, a horizontal treatment tank section 128 adjoining thereto, in which the vehicle bodies 110 are conveyed horizontally in a headfirst position, an inclined emersion section 130 adjoining thereto, in which the vehicle bodies 110 are conveyed out of the treatment tank 126 in a headfirst position at an angle of inclination of approximately 45°, and a horizontal outlet section 132 adjoining thereto, in which the vehicle bodies 110 are conveyed horizontally in a headfirst position to a lifting station 134 on the exit side.

In the lifting station 134 on the exit side, the skid frames 108 with the vehicle bodies 110 arranged thereon are lifted out of the pendulums 116 of the pendulum conveyor 118 and subsequently conveyed in the direction of conveyance 104 into a turning device 136 on the exit side.

The empty pendulums 116 are transported back to the lifting station 114 on the entry side by a return belt 138 of the conveyor means 120.

The vehicle bodies 100 conveyed into the turning device 136 on the exit side are transferred back in this device by rotation through 180° from the headfirst position into the standard position, in which window openings of the vehicle bodies 110 are arranged above the floor pan of the vehicle bodies 110.

Subsequently, the vehicle bodies 110 are conveyed in the standard position out of the turning device 136 on the exit side in the direction of conveyance 104 to a roller conveyor 140 on the exit side. The roller conveyor 140 on the exit side brings the vehicle bodies 110 in the standard position to a further treatment device (not illustrated), in which the next treatment step is carried out on the vehicle bodies 110.

However, it is by no means necessary for the vehicle bodies 110 to be transferred back into the standard position after each individual treatment section. On the contrary, it is possible to convey the vehicle bodies in the headfirst position through several treatment areas arranged one behind the other, for example, pretreatment areas, paint areas and drying areas and not transfer the vehicle bodies 110 back into the standard position until after the last of these treatment sections.

Following the overview given above of the entire conveyor cycle through the treatment device, the skid frames used as well as the individual components of the treatment device will be explained in the following in greater detail.

Each of the skid frames 108 used in the treatment device 100 described here, of which one is illustrated in detail in FIGS. 3 to 7, comprises two skid runners 142 which are arranged in parallel spaced relation to one another and are designed, for example, as hollow profiled sections with a rectangular cross section (FIG. 5).

Each of the skid runners 142 has a flat lower contact surface 144 essentially rectangular and extending in the longitudinal direction of the skid frame 108 and a flat upper contact surface 146 essentially rectangular, facing away from the lower contact surface 144 and likewise extending in the longitudinal direction of the skid frame 108.

The contact surfaces 144 and 146 serve to support the skid frame 108 on the casing surfaces 148 of cylindrical support members 149 of support rollers 150.

The skid runners 142 can therefore rest on support rollers of a roller conveyor not only in the standard position illustrated in FIGS. 3 to 5 (with the lower contact surface 144) but also in a headfirst position, in which the skid frame 108 is turned through 180° about a horizontal axis of rotation, (with the upper contact surface 146) and can be moved forwards due to the friction between the contact surfaces 144 or 146, on the one hand, and the casing surfaces of the support members 149, on the other hand.

As is apparent from FIGS. 4 and 5, the outer side of the outer side wall 154 of the skid runners 142 facing away from a central plane 152 of the skid frame 108 each forms a guide surface 156, these guide surfaces interacting with flanges 158 of the support rollers 150 to keep the skid frame 108 aligned centrally and parallel to the direction of conveyance during transport on the roller conveyor.

As is apparent from FIGS. 3 and 4A, the two skid runners 142 of the skid frame 108 are connected to one another by means of several, for example, five crossbars 160 aligned at right angles to the skid runners 142. The crossbars 160 are designed, for example, as U-shaped profiled bars and held at both ends on the inner side walls 164 of the skid runners 142 facing the central plane 152 of the skid frame 108 by means of supports 162.

Furthermore, the skid frame 108 comprises a front crossrail 166 and a rear crossrail 168 which extend at right angles to the longitudinal direction of the skid frame 108 and are held on the inner side walls 164 of the skid runners 142 by supports 170.

As is apparent from FIG. 3, the supports 170 of the crossrails 166 and 168 are of a longer design than the supports 162 of the crossbars 160 and so the crossrails 166, 168 are at a greater vertical distance from the skid runners 142 than the crossbars 160.

The crossrails 166 and 168 serve to accommodate the vehicle body 110 to be supported and are provided for this purpose at their ends with locking elements 172, by means of which the vehicle body 110 can be secured in place on the crossrails 166, 168. The locking elements 172 are designed such that they prevent any relative movement between the vehicle body 110 and the skid frame 108, irrespective of the orientation of the skid frame 108 and the vehicle body 110 arranged thereon with respect to the vertical.

Furthermore, contacting elements 171 are provided, by means of which an electrical contact is established between a contacting dome of the skid frame 108 (not illustrated) and the vehicle body 110 arranged thereon in order to be able to carry out, for example, a cathodic dip painting.

The contacting elements 171 may be formed, for example, from flat copper material.

Instead of contacting the vehicle body 110 by means of the contacting elements 171 it may also be provided for the electrical contact to the vehicle body to be provided by the supporting elements of the skid frame 108 itself which consist preferably of steel.

The vehicle body 110 is secured in position on the skid frame 108 such that a floor pan 173 of the vehicle body 110 faces the skid frame 108 whereas window openings 174 and the roof 176 are arranged in an area of the vehicle body 110 facing away from the skid frame 108.

For the transport through the treatment device 100, doors 178 present on the vehicle body 119, a hood 180 as well as a trunk lid or, where applicable, a tailgate 182 are slightly open in order to create as many penetration openings as possible for the liquid from the treatment tank 126 to penetrate into the interior of the vehicle body 110.

Furthermore, each skid frame 108 has on each skid runner 142 two respective suspension areas 184 which are arranged at a distance from one another on the inner side wall 164 of the respective skid runner 142.

Figure 7:
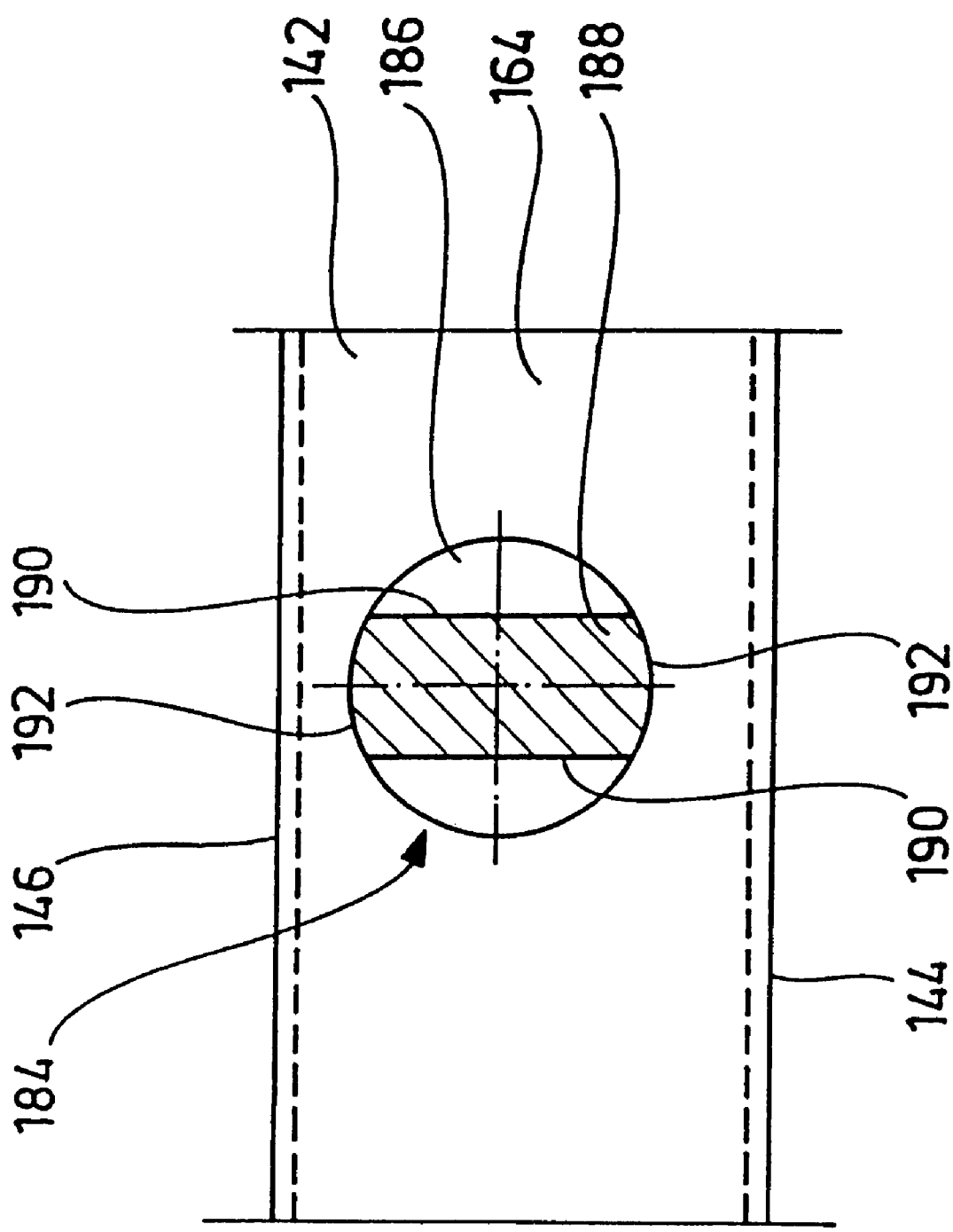
FIG. 7 shows a side view of the skid runner and the suspension area of the skid frame from FIG. 5, partially cut away along line 7—7 in FIG. 5.

Each of the suspension areas 184 comprises a cylindrical section 186 which is secured at one of its end sides on the inner side wall 164 of the relevant skid runner 142 and at its end side facing away from the skid runner 142 supports a suspension pin 188 which has two flat side surfaces 190 which are connected to one another by two cylindrically curved side surfaces 192 (cf. FIGS. 5 to 7).

At its end facing away from the cylindrical section 186 the suspension pin 188 supports a cylindrical stop disk 194, the diameter of which exceeds the diameter of the cylindrical section 186 and the suspension pin 188.

The suspension areas 184 serve to suspend the skid frame 108 in four pendulums 116 of the pendulum conveyor 118, which will be described in greater detail in the following.

The skid frame 108 with the vehicle body 110 arranged thereon is placed in the standard position on the roller conveyor 106 of the conveyor device 102 on the entry side, i.e. in such a manner that the vehicle body 110 is arranged above the skid frame 108 and the window openings 174 of the vehicle body 110 above the floor pan 173.

Furthermore, the skid frame 108 with the vehicle body 110 is placed on the roller conveyor 106 on the entry side such that the rear end of the vehicle body 110 points in the direction of conveyance 104 while the front portion of the vehicle body 110 with the hood 180 points rearwards contrary to the direction of conveyance 104.

In this position the skid frame 108 is conveyed with the vehicle body 110 by the roller conveyor 106 on the entry side into the turning device 112 on the entry side which is illustrated in detail in FIGS. 8 to 17.

Figure 8:
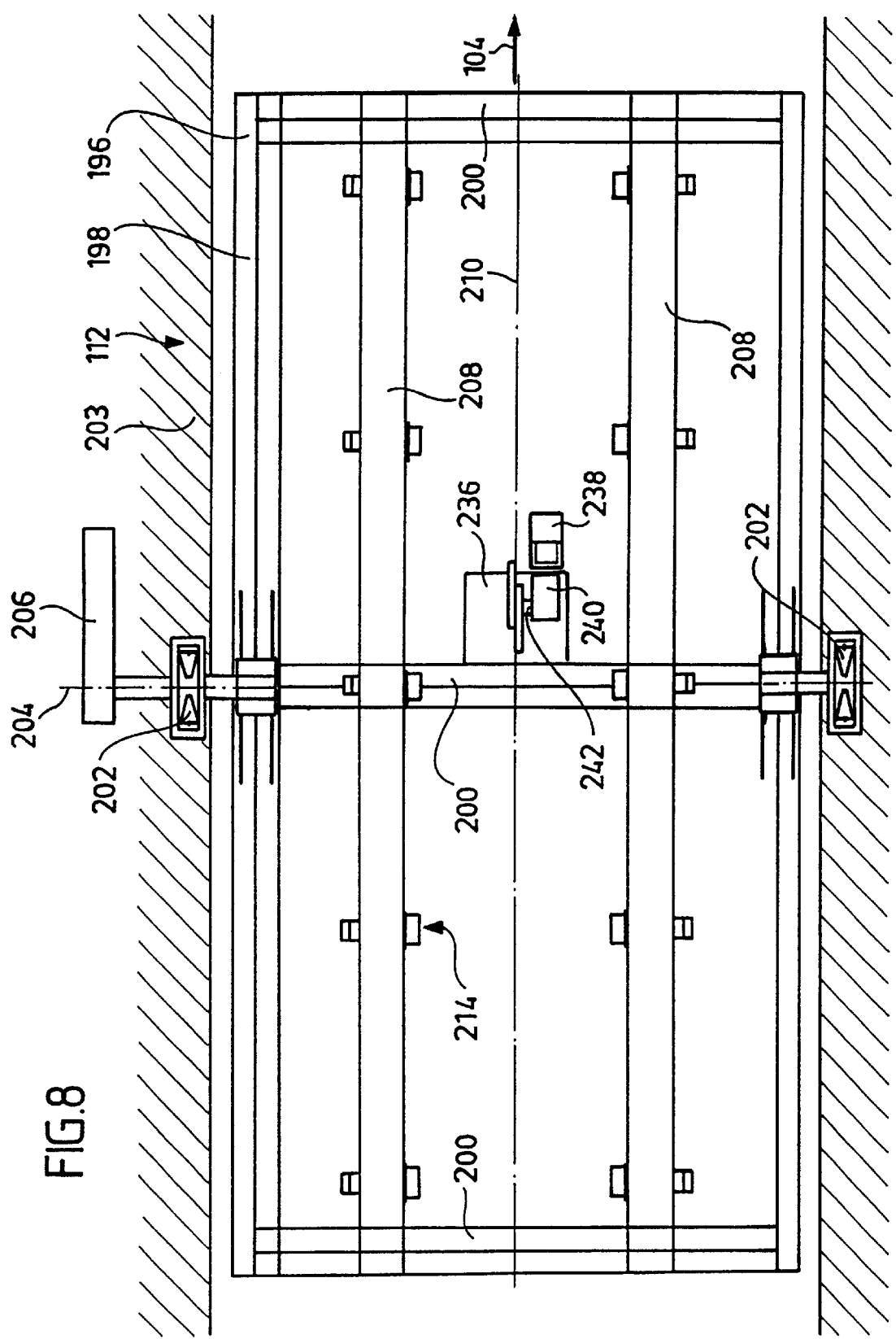
FIG. 8 shows a schematic plan view of the entry turning device of the conveyor device from FIG. 1.
Figure 9:
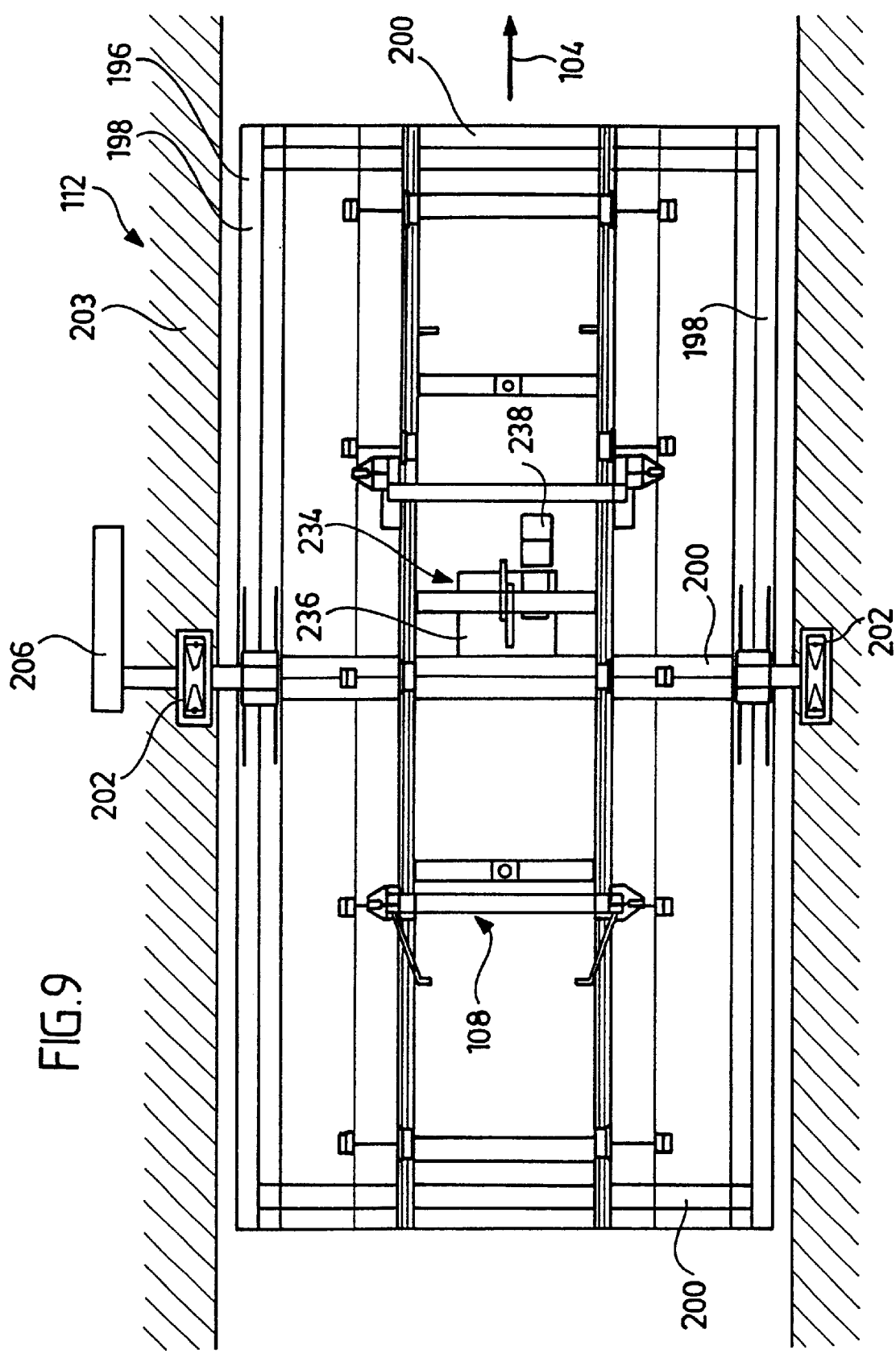
FIG. 9 shows a schematic plan view of the entry turning device from FIG. 8 with a skid frame arranged thereon.
Figure 12:
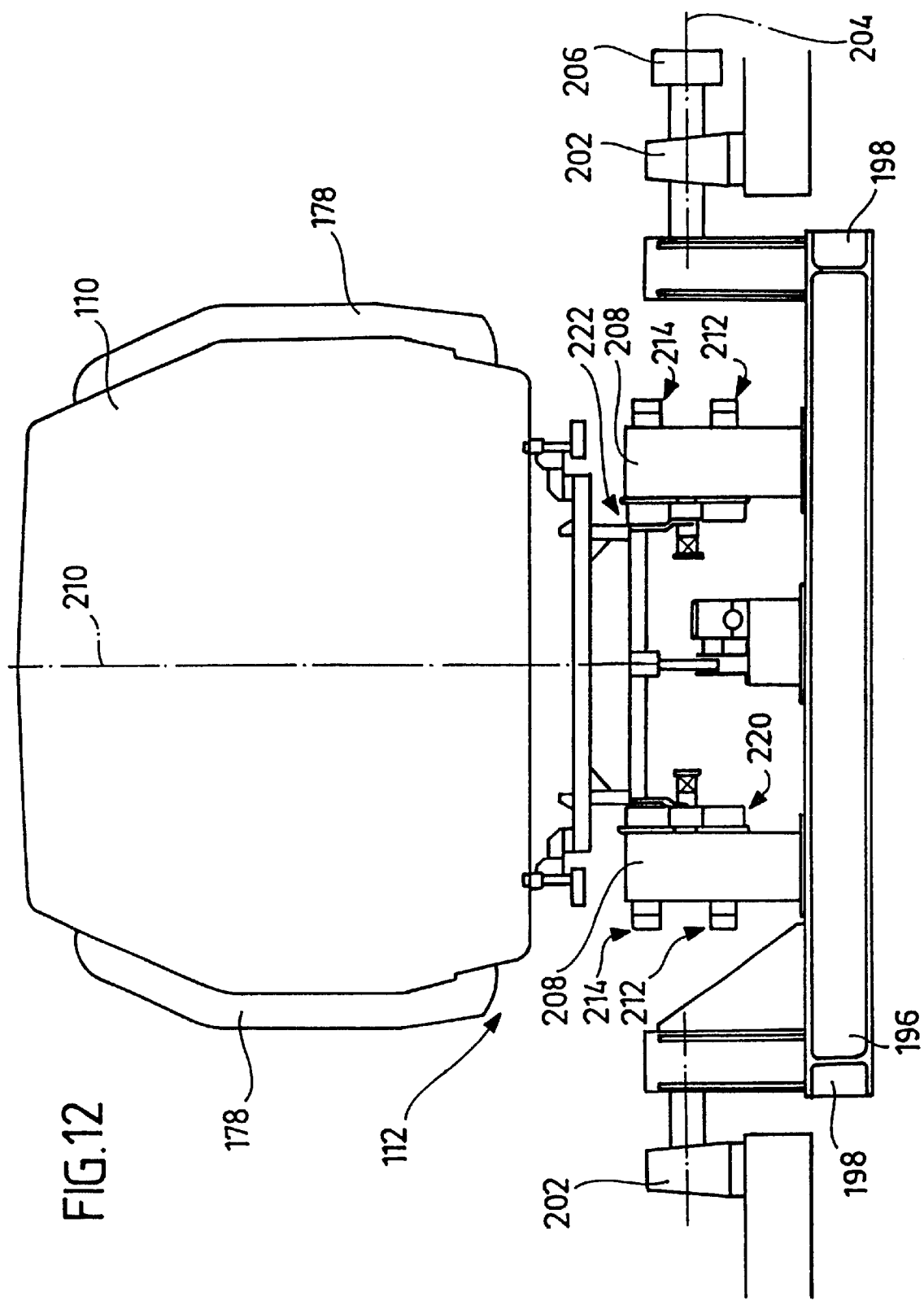
FIG. 12 shows a schematic front view of the entry turning device with a skid frame arranged thereon and a vehicle body arranged on the skid frame.
Figure 13:
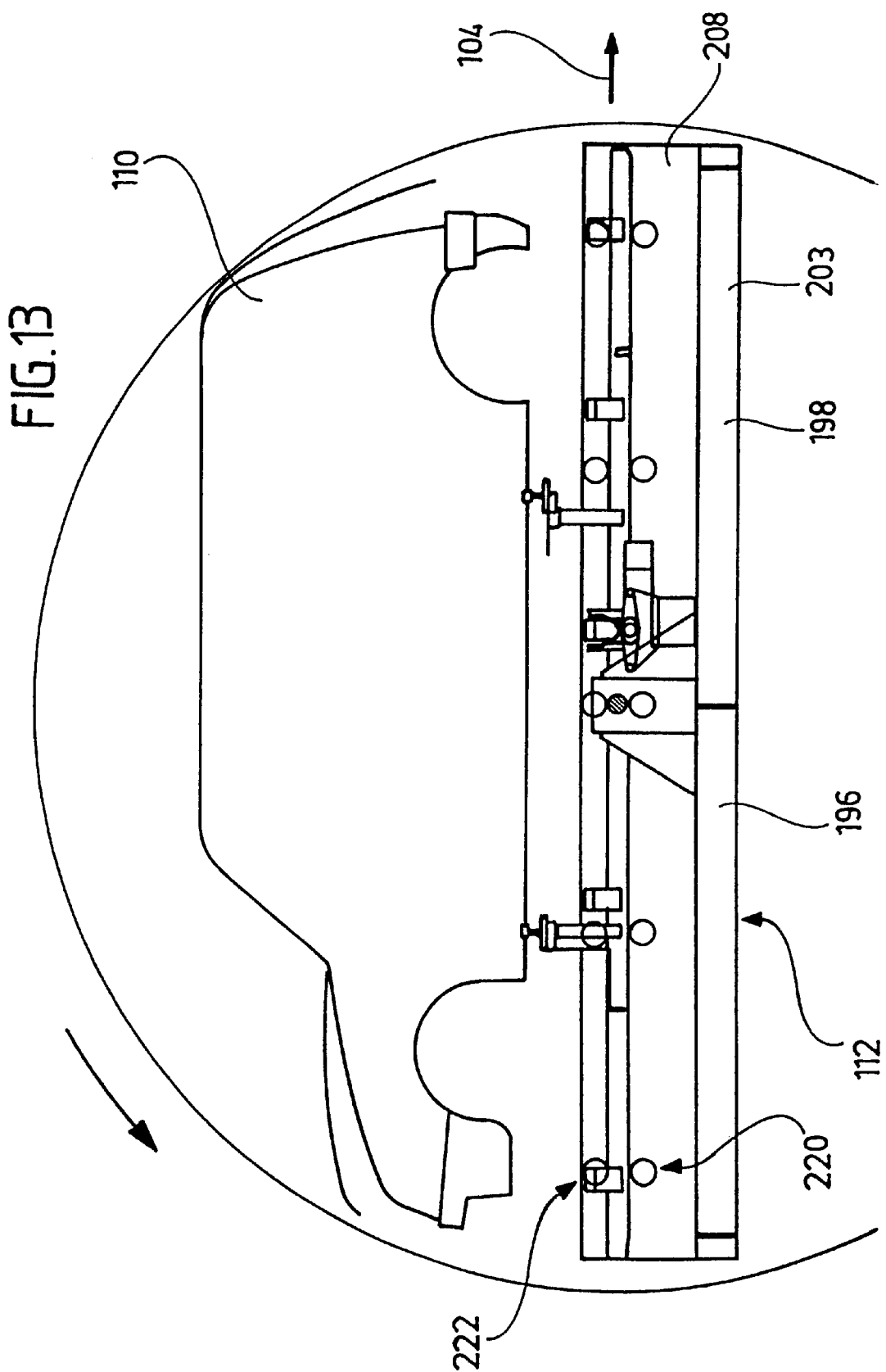
FIG. 13 shows a schematic side view of the entry turning device with a skid frame arranged thereon and a vehicle body arranged on the skid frame which is in the standard position.

As can best be seen from FIGS. 8, 12 and 13, the turning device 112 on the entry side comprises a right-angled turning frame 196 with two longitudinal supports 198 which are aligned parallel to the direction of conveyance 104 and are connected to one another by means of three cross supports 200.

The turning frame 196 is mounted on two bearing blocks 202 for rotation about a horizontal axis of rotation 204 aligned at right angles to the direction of conveyance 104. The bearing blocks 202 rest on a stationary frame 203 of the turning device 112.

The rotary movement of the turning frame 196 about the axis of rotation 204 is actuated by means of a rotary drive motor 206 illustrated schematically in FIGS. 8 and 12.

The cross supports 200 of the turning frame 196 support two supporting brackets 208 which extend parallel to the direction of conveyance 104 and are designed to be symmetrical to one another in relation to a central plane 210 of the turning frame 196.

Figure 10:
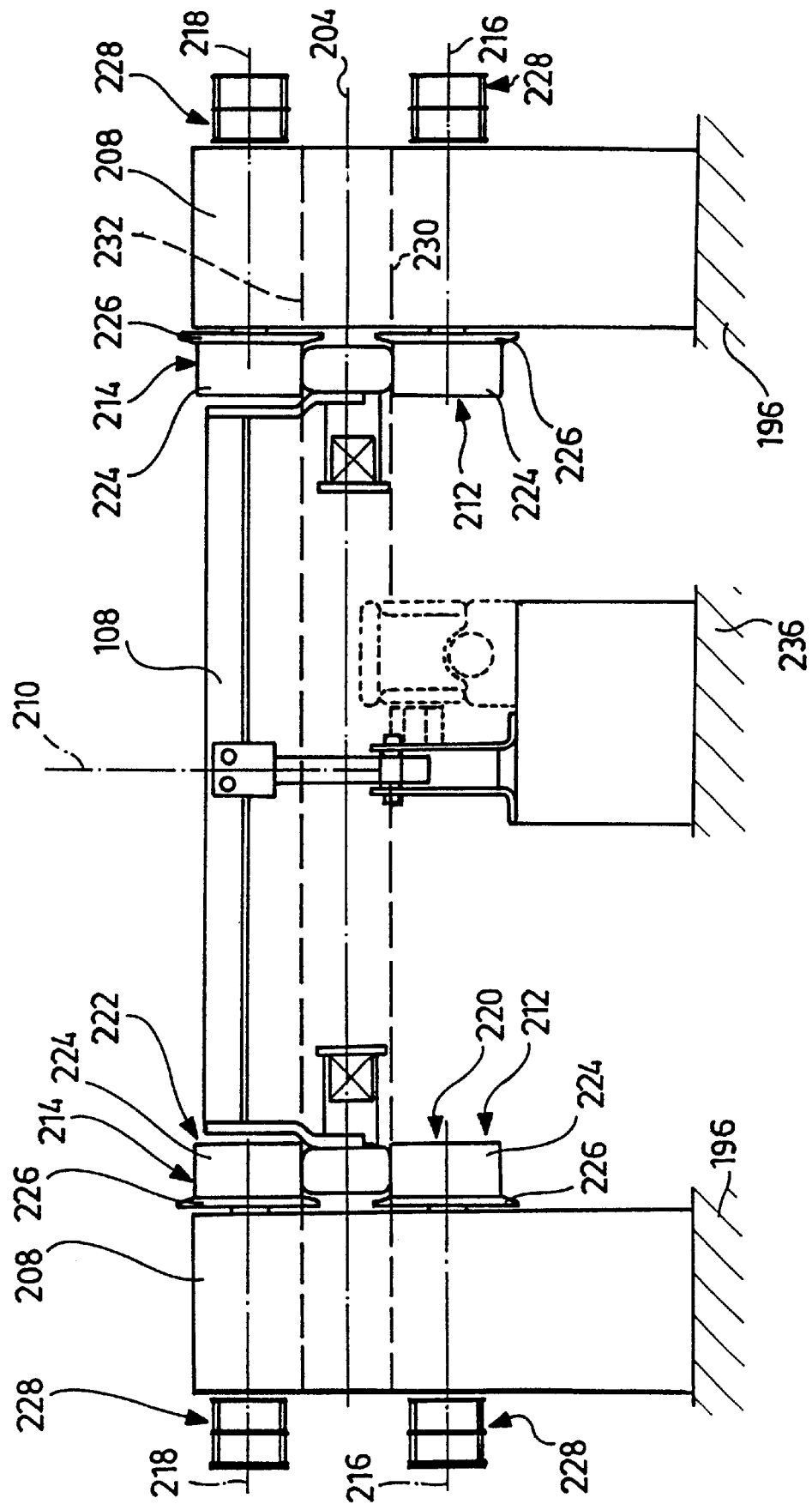
FIG. 10 shows a schematic front view of two roller conveyors of the entry turning device with a skid frame arranged thereon.
Figure 11:
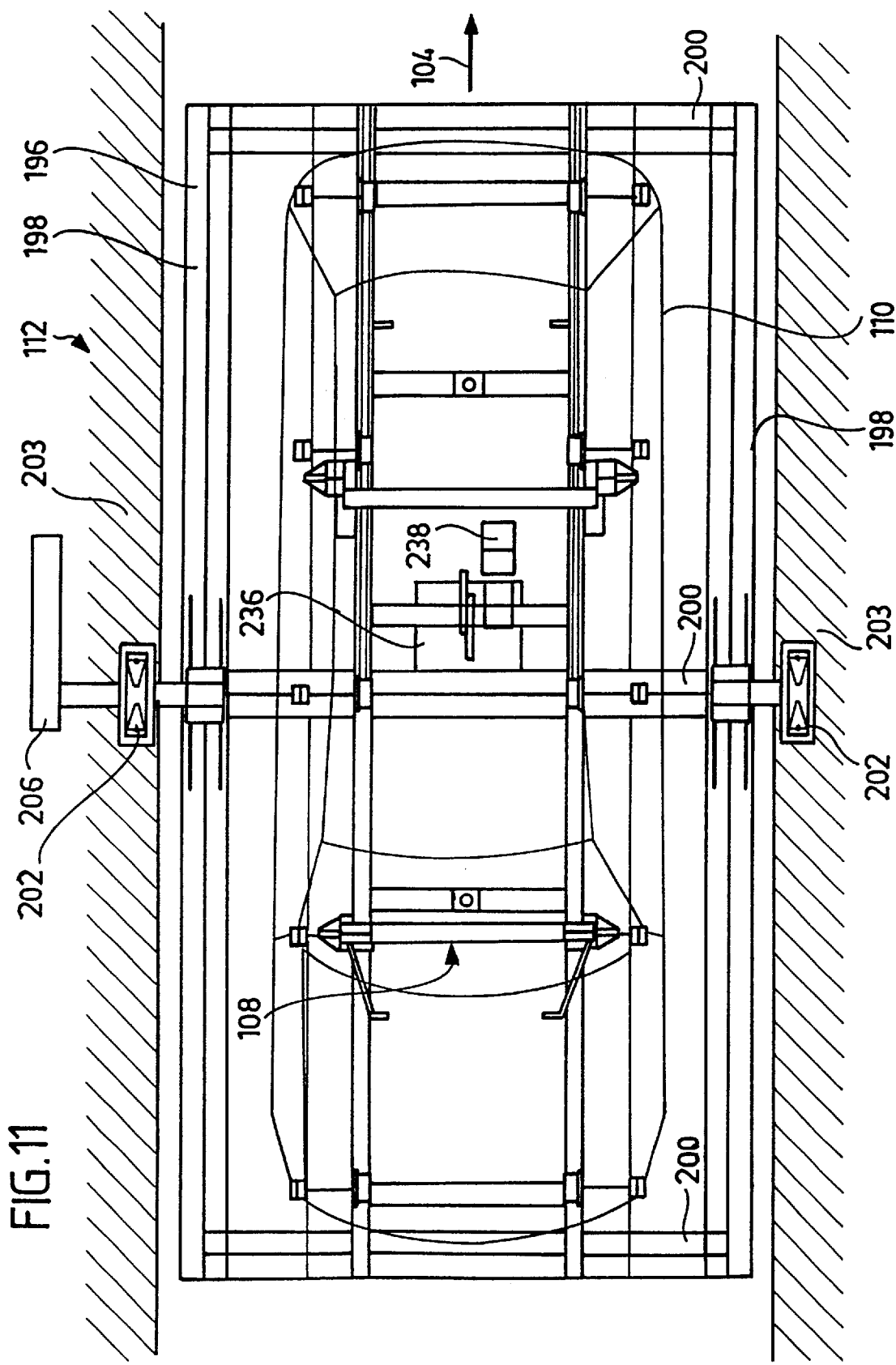
FIG. 11 shows a schematic plan view of the entry turning device with a skid frame arranged thereon and a vehicle body arranged on the skid frame.

As is best seen from FIG. 10, lower support rollers 212 and upper support rollers 214 are mounted in each of the supporting brackets 208 for rotation about horizontal axes of rotation 216 and 218, respectively, aligned at right angles to the direction of conveyance 104.

Several, for example, five lower support rollers 212 are arranged in each of the supporting brackets 208 at equal distances along the direction of conveyance 104 and at a constant distance from the upper side of the turning frame 196 so that the lower support rollers 212 in the two supporting brackets 208 together form a lower roller conveyor 220 of the turning device 112.

A respective upper support roller 214 is arranged vertically above each lower support roller 212 in the relevant supporting bracket 208, wherein the vertical distance of the axes of rotation 216 and 218, respectively, of the lower support rollers 212 and upper support rollers 214 allocated to one another in pairs is constant so that the upper support rollers 214 in the two supporting brackets 208 also form together an upper roller conveyor 222 of the turning device 112.

As is apparent from FIG. 10, each of the support rollers 212 or 214 comprises at an inner end, i.e. facing the central plane 210 of the turning frame 196, a cylindrical support member 224 which is adjoined by a respective flange 226 in the direction towards the supporting bracket 208.

A double toothed belt pulley 228 is arranged at an outer end, i.e. facing away from the central plane 210 of the turning frame 196, of each support roller 212 or 214. The support rollers 212, 214 are in operative connection with one or several drive motors (not illustrated) by means of toothed belts (also not illustrated) resting on the toothed belt pulleys 228 so that a rotary movement of the support members 224 of the support rollers 212, 214 can be induced.

The support members 224 of the support rollers 212 of the lower roller conveyor 220 have a common upper tangential plane which forms a lower supporting surface 230 for the skid frame 108.

The lower supporting surface 230 is therefore defined by the upper apex lines of the support members 224 of the support rollers 212 of the lower roller conveyor 220.

In a corresponding manner, the support members 224 of the upper support rollers 214 of the upper roller conveyor 222 have a common lower tangential plane which forms an upper supporting surface 232 for the skid frame 108.

The upper supporting surface 232 is therefore defined by the lower apex lines of the support members 224 of the support rollers 214 of the upper roller conveyor 222.

The axis of rotation 204 of the turning frame 196 extends centrally between the lower supporting surface 230 and the upper supporting surface 232.

The vertical distance of the upper supporting surface 232 from the lower supporting surface 230 corresponds to the height of a skid runner 142 so that the skid runners 142 of a skid frame 108 introduced into the turning device 112 are supported with their lower contact surfaces 144 on the support members 224 of the support rollers 212 of the lower roller conveyor 220 and at the same time come to rest with their upper contact surfaces 146 on the support members 224 of the support rollers 214 of the upper roller conveyor 222 of the turning device 112.

A skid frame 108 located in the turning device 112 is thus secured by the supporting surfaces 230 and 232 against any relative movement in relation to the turning frame 196 at right angles to these supporting surfaces 230, 232.

The skid frame 108 is secured against any relative movement with respect to the turning frame 196 parallel to the axes of rotation 216 or 218 of the support rollers 212 and 214, respectively, by the flanges 226 of the support rollers.

The skid frame 108 is secured against any relative movement with respect to the turning frame 196 in longitudinal direction of the turning frame 196 by means of a clamping means 234 which is supported by a support plate 236 secured in position on the central cross support 200 of the turning frame 196.

The clamping means 234 comprises a drive motor 238 which actuates the rotary movement of a drive shaft 242 (FIGS. 16 and 17) via a miter gear 240, the axis of rotation 244 of the drive shaft being aligned parallel to the axes of rotation 216, 218 of the support rollers 212, 214 and thus parallel to the crossbars 160 of the skid frame 108.

The drive shaft 242 supports a cylindrical drive pin 246 which is arranged eccentrically to the shaft and extends parallel to the axis of rotation 244 through a longitudinal hole 248 of a first clamping lever 250 and through a longitudinal hole 252 of a second clamping lever 254.

The two clamping levers 250 and 254 are articulatedly connected to a base 260 secured on the support plate 236 at points of articulation 256 and 258, respectively, spaced from one another at right angles to the axis of rotation 244.

Both clamping levers 250 and 254 are designed as essentially right-angled angle levers and provided at their respectively free end with an adjustable clamping element 262, for example, a threaded screw 263 with a counternut 266 penetrating one of the free arms of the clamping levers 250 and 254, respectively.

Figure 16:
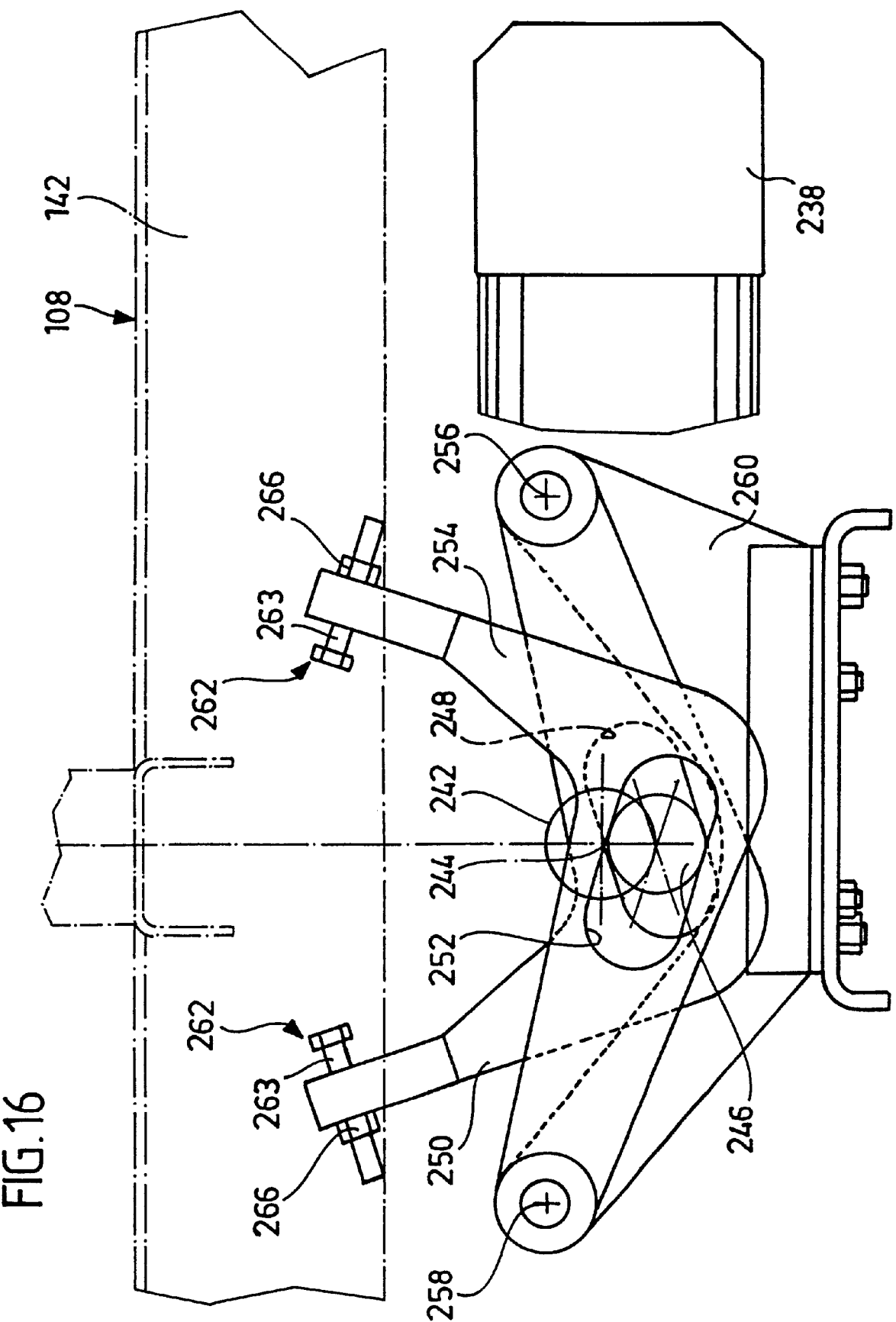
FIG. 16 shows a schematic illustration of a clamping means of the entry turning device in an opened state.

In an open position of the clamping means 234 illustrated in FIG. 16 the drive pin 246 is arranged vertically beneath the axis of rotation 244 of the drive shaft 242, and the clamping elements 262 of the clamping levers 250, 254 are spread wide apart.

Figure 17:
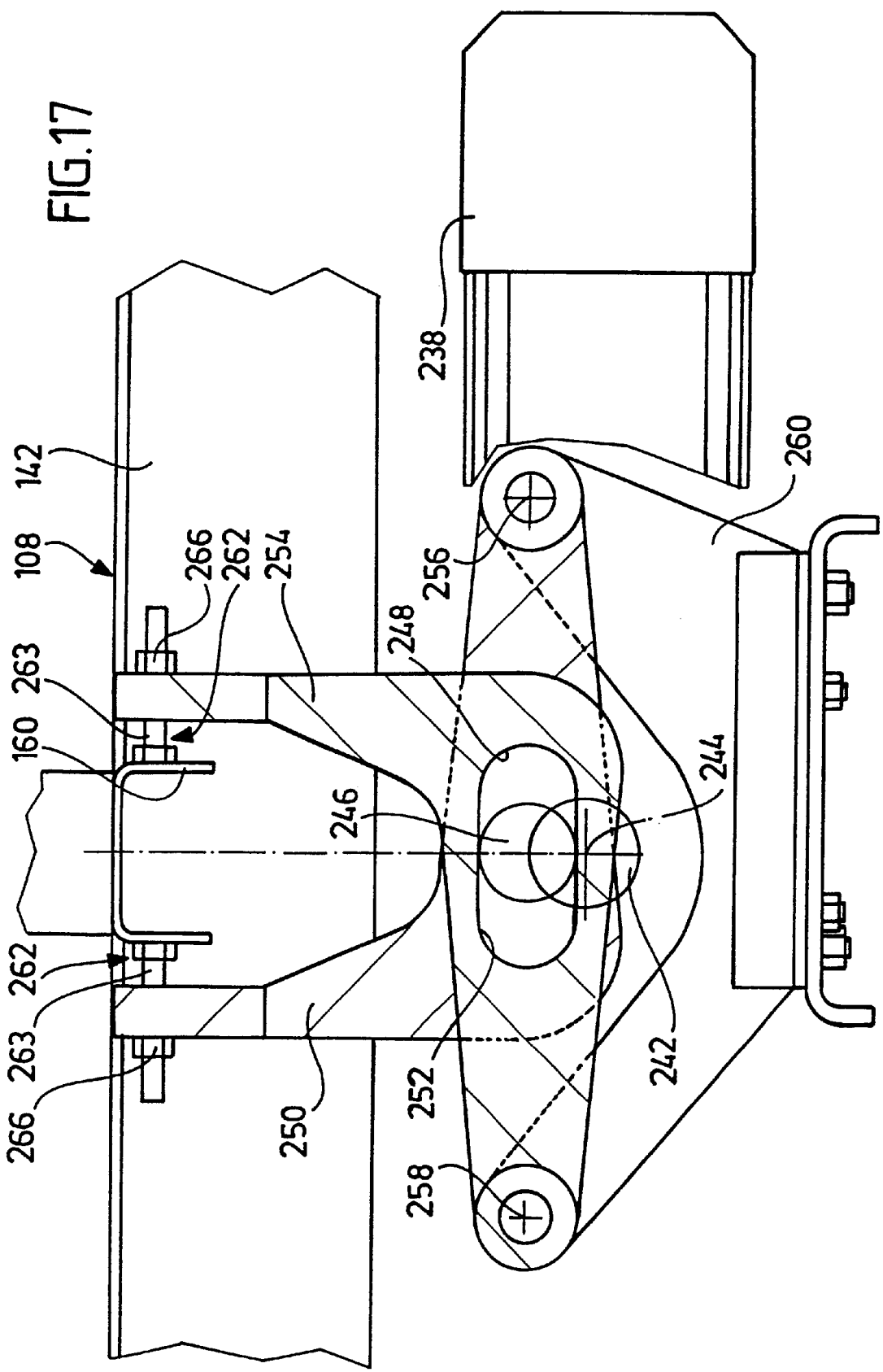
FIG. 17 shows a schematic illustration of the clamping means from FIG. 16 in the closed state.

By rotating the drive shaft 242 by means of the drive motor 238 through an angle of 180° the drive pin 246 can be moved into the position illustrated in FIG. 17, in which the drive pin 246 is arranged vertically above the axis of rotation 244.

On account of the movement of the drive pin 246 from its lower position (FIG. 16) into its upper position (FIG. 17), the clamping levers 250 and 254 communicating with the circumference of the drive pin 246 at the edge of the longitudinal holes 248, 252 are pivoted about their points of articulation 256 and 258, respectively, into the closed position illustrated in FIG. 17, in which the clamping elements 262 of the clamping levers 250 and 254 are located opposite one another at a closure distance.

The closure distance of the clamping means 234 is equal in size to the width of one of the crossbars 160 of the skid frame 108 so that a crossbar 160 of the skid frame 108 arranged between the clamping elements 262 in the closed position of the clamping means 234 abuts on the clamping elements 262 on both sides and thus is prevented by the clamping elements 262 from moving relative to the clamping means 234 and thus relative to the turning frame 196 in the longitudinal direction of the turning frame 196.

Following closure of the clamping means 234, a skid frame 108 introduced into the turning device 112 on the entry side is thus prevented from moving in any way relative to the turning frame 196 by the clamping means 234, by the flanges 226 of the support rollers 212, 214 and by the support members 224 of the support rollers 212, 214.

Figure 15:
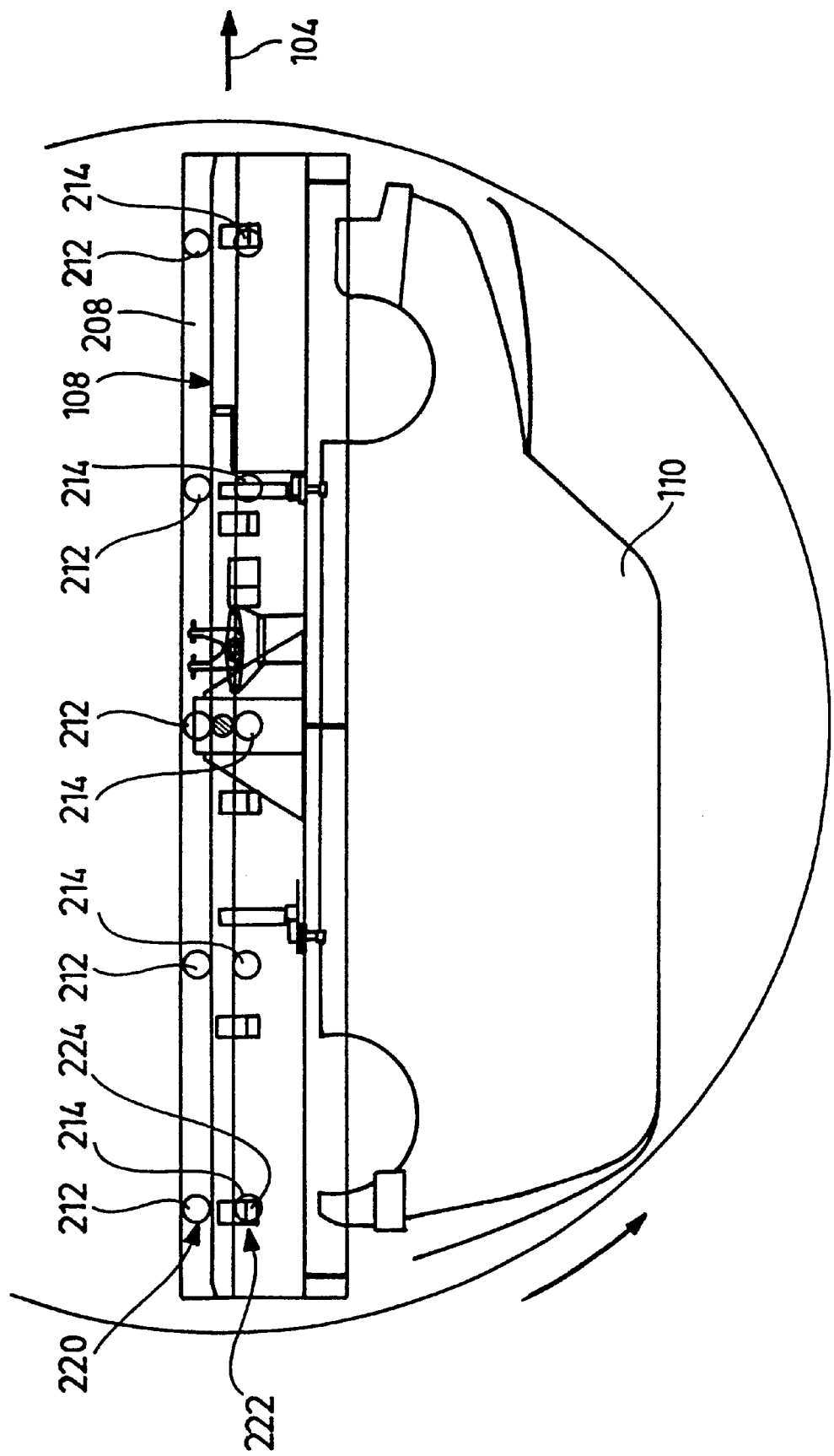
FIG. 15 shows a schematic side view of the entry turning device with a skid frame arranged thereon and a vehicle body arranged on the skid frame which has been transferred into a headfirst position by a rotation through 180°.

Once the clamping means 234 has been closed about a crossbar 160 of the skid frame 108, the vehicle body 110 arranged on the skid frame 108 is transferred from the standard position illustrated in FIG. 13 into the headfirst position illustrated in FIG. 15 by a rotation of the turning frame 196 through an angle of 180° about the axis of rotation 208, actuated by the rotary drive motor 206.

Figure 14:
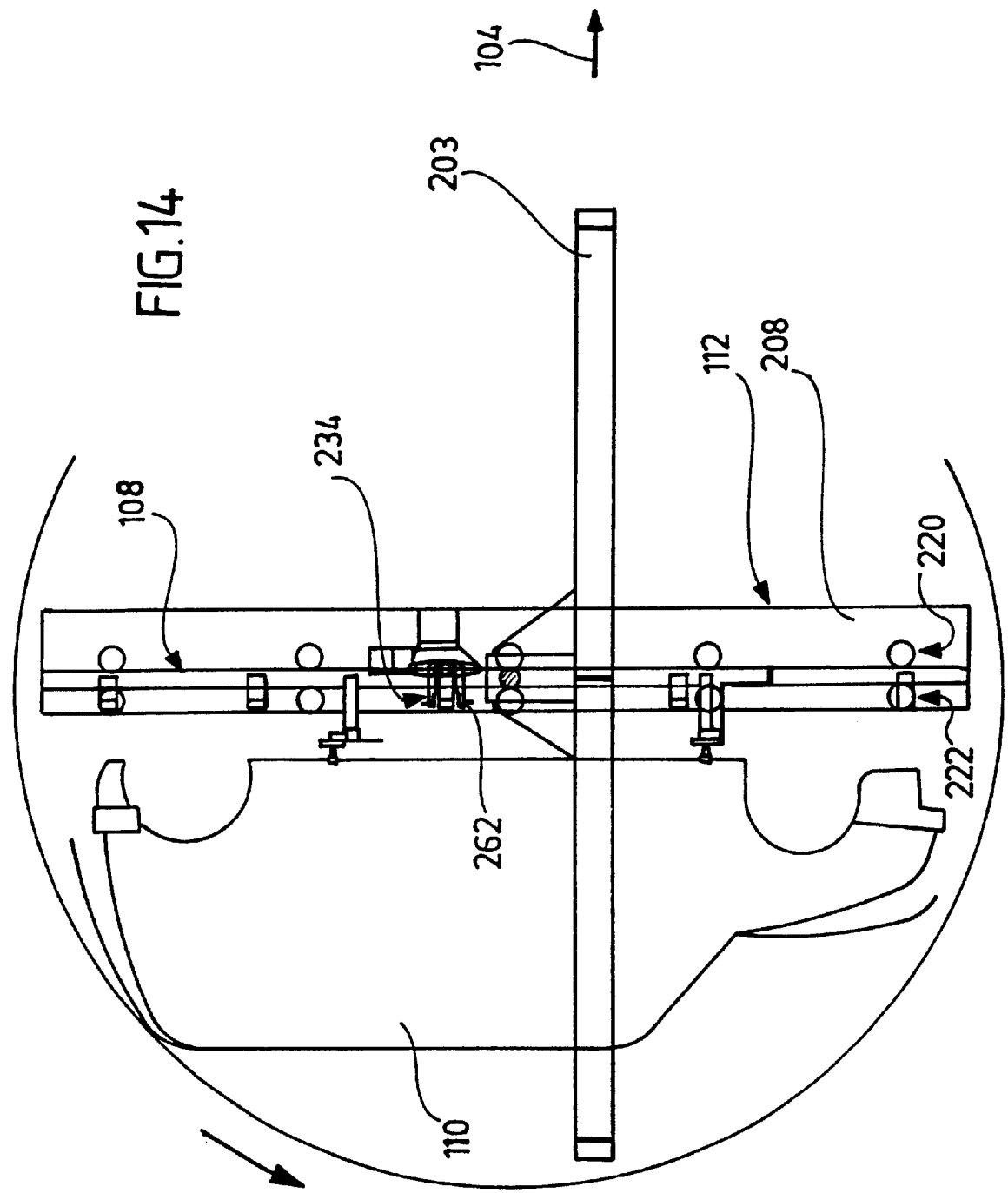
FIG. 14 shows a schematic side view of the entry turning device with a skid frame arranged thereon and a vehicle body arranged on the skid frame which has been turned out of the standard position through an angle of 90°.

The intermediate position of the vehicle body 110 and the skid frame 108 illustrated in FIG. 14 is reached after a rotation of the turning frame 196 through an angle of 90°. In this intermediate position, the weight of the vehicle body 110 and the skid frame 108 is supported by the lower of the two clamping elements 262 of the clamping means 234 in this position.

In the headfirst position of the vehicle body 110 illustrated in FIG. 15, its weight and that of the skid frame 108 is supported by the support members 224 of the support rollers 214 of the upper roller conveyor 222.

After the turning procedure of the turning frame 196 is completed, the clamping means 234 is transferred into its open position again, in which the clamped crossbar 160 of the skid frame 108 is released, due to rotation of the drive shaft 242 through 180°.

Subsequently, the skid frame 108 with the vehicle body 110 is conveyed in a headfirst position along the direction of conveyance 104 out of the turning device 112 on the entry side and into the lifting station 114 on the entry side due to actuation of the support roller 214 of the upper roller conveyor 222.

Figure 18:
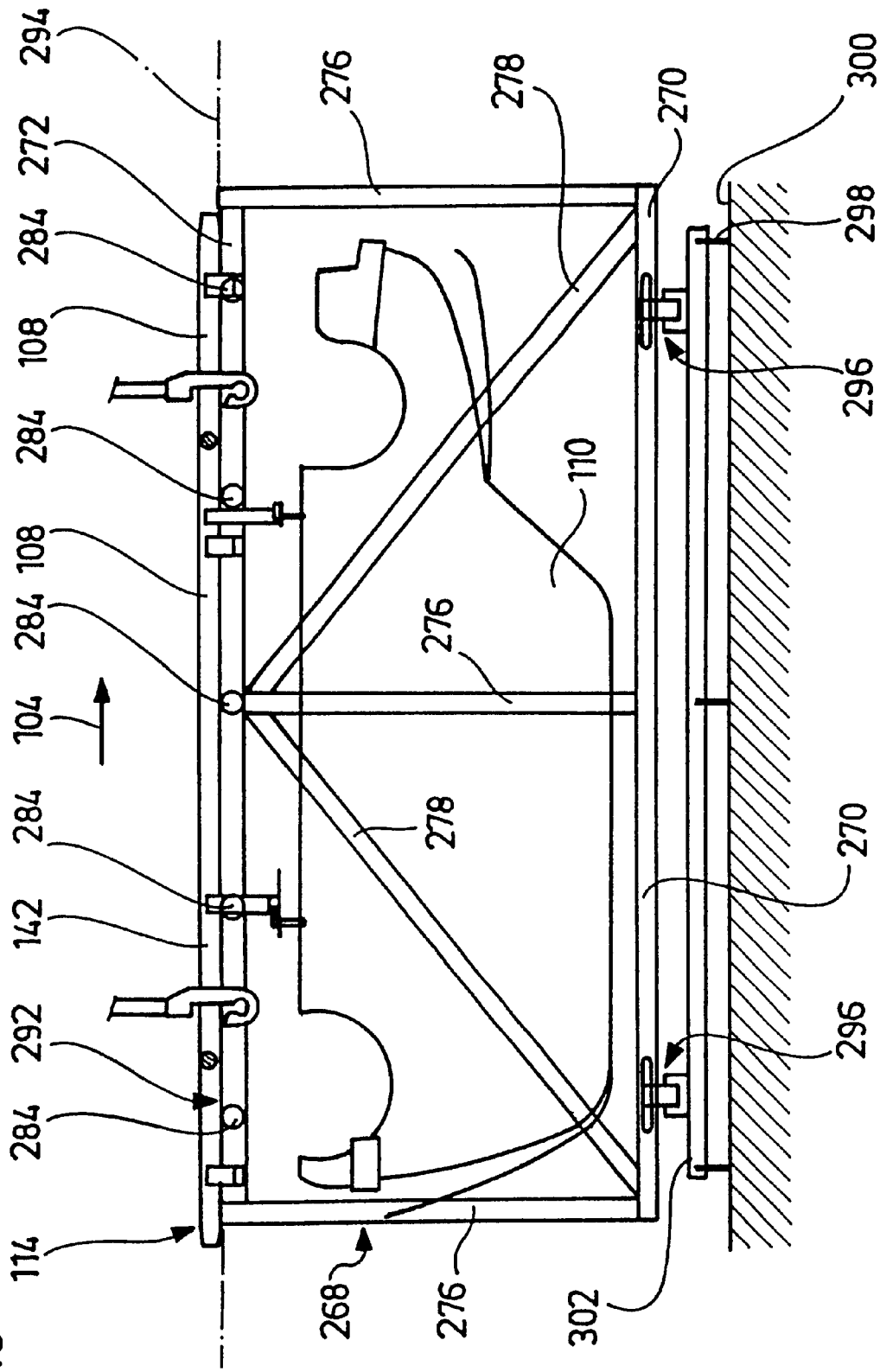
FIG. 18 shows a schematic side view of the entry lifting station of the conveyor device from FIG. 1 with a skid frame supported by the lifting station and a vehicle body arranged on the skid frame in a headfirst position.
Figure 19:
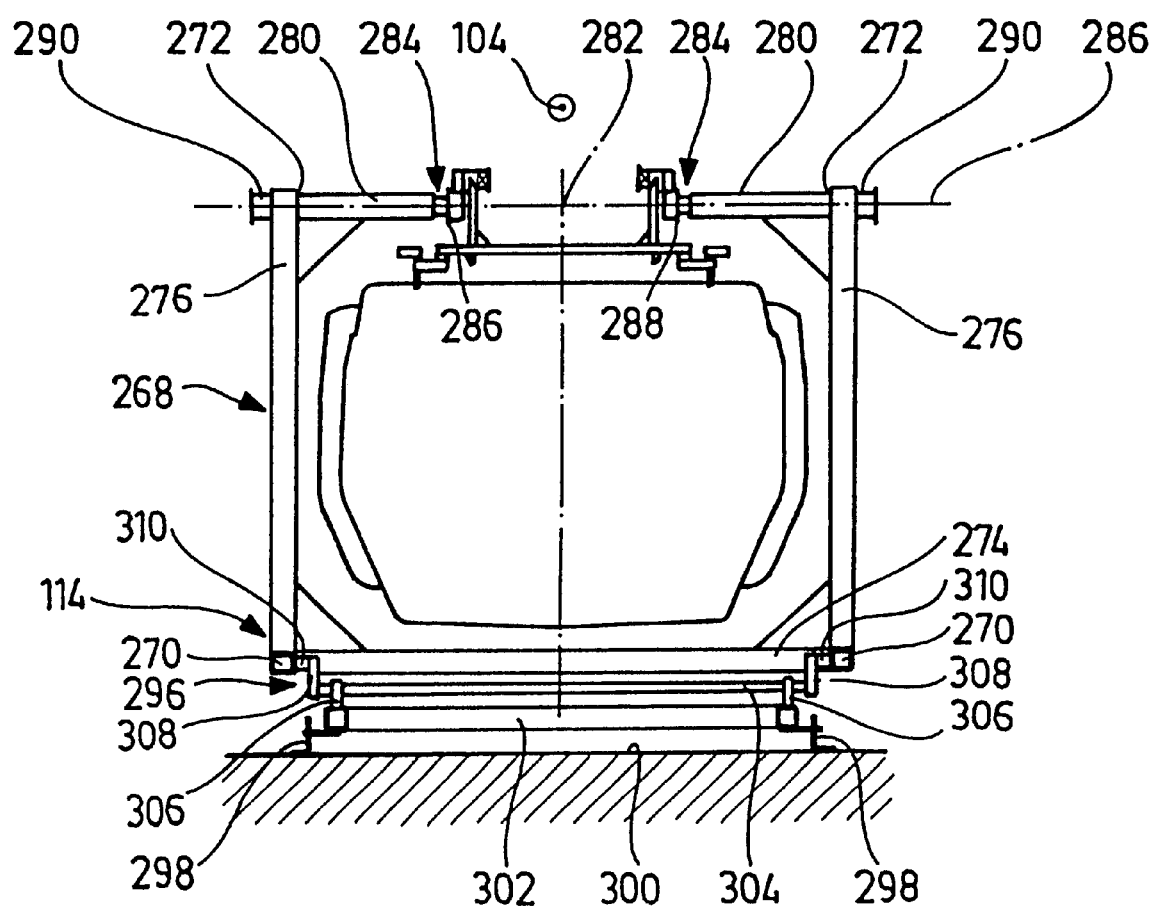
FIG. 19 shows a schematic front view of the lifting station from FIG. 18.

As is apparent from FIGS. 18 and 19, the lifting station 114 comprises a lifting frame 268 with an essentially parallelepiped outer contour which consists of lower longitudinal supports 270 and upper longitudinal supports 272 aligned parallel to the direction of conveyance 104, cross supports 274 connecting the two lower longitudinal supports 270 to one another, horizontally aligned support bars 276 connecting the lower longitudinal supports 270 to the upper longitudinal supports 272 and diagonal struts 278 increasing the torsional strength of the lifting frame 268.

As is apparent from FIG. 19, bearing bushes 280 extend from both upper longitudinal supports 272 towards a central plane 282 of the lifting frame 268.

Support rollers 284 are mounted in these bearing bushes 280 for rotation about axes of rotation 286 aligned at right angles to the direction of conveyance 104.

Each of the support rollers 284 has a respective cylindrical support member 286 and a flange 288 at an inner end facing the central plane 282 of the lifting frame 268.

At one end facing away from the central plane 282 and extending laterally beyond the lifting frame 268, each of the support rollers 284 is provided with a belt pulley 290. All the belt pulleys 290 are connected via toothed belts (not illustrated) to one or several drive motors (likewise not illustrated), by means of which the support rollers 284 can be driven to perform a rotary movement.

As is apparent from FIG. 18, several support rollers 284, for example five each, are arranged equidistantly behind one another in each of the upper longitudinal supports 272. The support rollers 284 arranged on the upper longitudinal supports 272 of the lifting frame 268 thus form together a roller conveyor 292 of the lifting station 114 for the skid frames 108.

The support members 286 of the support rollers 284 have a common upper tangential plane which forms a supporting surface 294 for the skid frames 108.

In the lifted position of the lifting frame 268 illustrated in FIGS. 18 and 19, the supporting surface 294 of the roller conveyor 292 of the lifting station 114 is at the same height as the supporting surface 232 of the upper roller conveyor 222 of the turning device 112 and so the skid frames 108, after they have been turned in the turning device 112 on the entry side, can be conveyed horizontally from the upper roller conveyor 222 of the turning device 112 onto the roller conveyor 292 of the lifting station 114.

If a skid frame 108 with vehicle body 110 arranged thereon has run into the lifting station 114, the lifting frame 268 can be lowered by means of a lifting device 296 which is arranged beneath the lifting frame 268 on a stationary frame 302 which is supported on a base 300 by means of supporting feet 298.

The lifting device 296 comprises two lifting drive shafts 304 (FIG. 19) which extend at right angles to the direction of conveyance 104 and are mounted for rotation in bearing blocks 306 supported by the stationary frame 302.

A respective end of an eccentric lever 308 is non-rotatably secured at both ends of each lifting drive shaft 304, the free end of said eccentric lever supporting a guide roller 310.

Each of the eccentric levers 308 with its end facing away from the lifting drive shaft 304 is guided by means of the respective guide roller 310 in a guide section 312, which has a U-shaped cross section and is arranged on the inner side of a respective one of the lower longitudinal supports 270 of the lifting frame 268, for displacement in the longitudinal direction of the lifting frame 268.

Moreover, the lifting frame 268 is guided in vertical direction by means of a movable angle section (not illustrated), on which guide rollers are rotatably mounted, on a stationary angle section (not illustrated) which is secured on the stationary frame 302 and on which the guide rollers of the movable angle section roll along.

By means of synchronous rotation of the lifting drive shafts 304 by means of a rotary drive (not illustrated), the lifting frame 268 can thus be transferred from the elevated position illustrated in FIGS. 18 and 19, in which the eccentric levers 308 extend vertically upwards proceeding from the respective lifting drive shaft 304, into a lowered position of the lifting frame 268 (not illustrated), in which the eccentric levers 308 extend vertically downwards proceeding from the respective lifting drive shaft 304.

In this respect, the lifting frame 268, the skid frame 108 supported on the supporting surface 294 of the roller conveyor 292 and the vehicle body 110 arranged on the skid frame move vertically downwards. As a result of this downwardly directed movement of the skid frame 108, the skid frame is suspended with the suspension pins 188 of its suspension areas 184 in carrier hooks 314 of the pendulums 116 of the pendulum conveyor 118 which (in a manner to be described in greater detail) are moved through the lifting station 114 along the direction of conveyance 104 between the supporting rollers 284 of the roller conveyor 292 of the lifting station 114 by means of the conveyor means 120.

Figure 20:
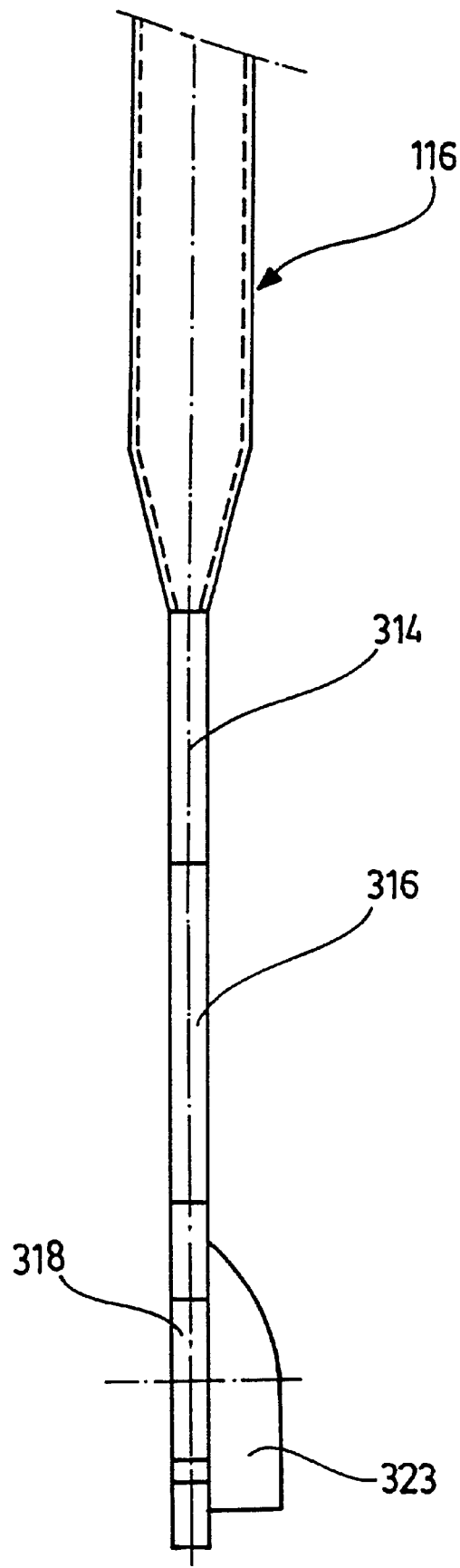
FIG. 20 shows a schematic front view of a pendulum of the pendulum conveyor from FIG. 1.
Figure 21:
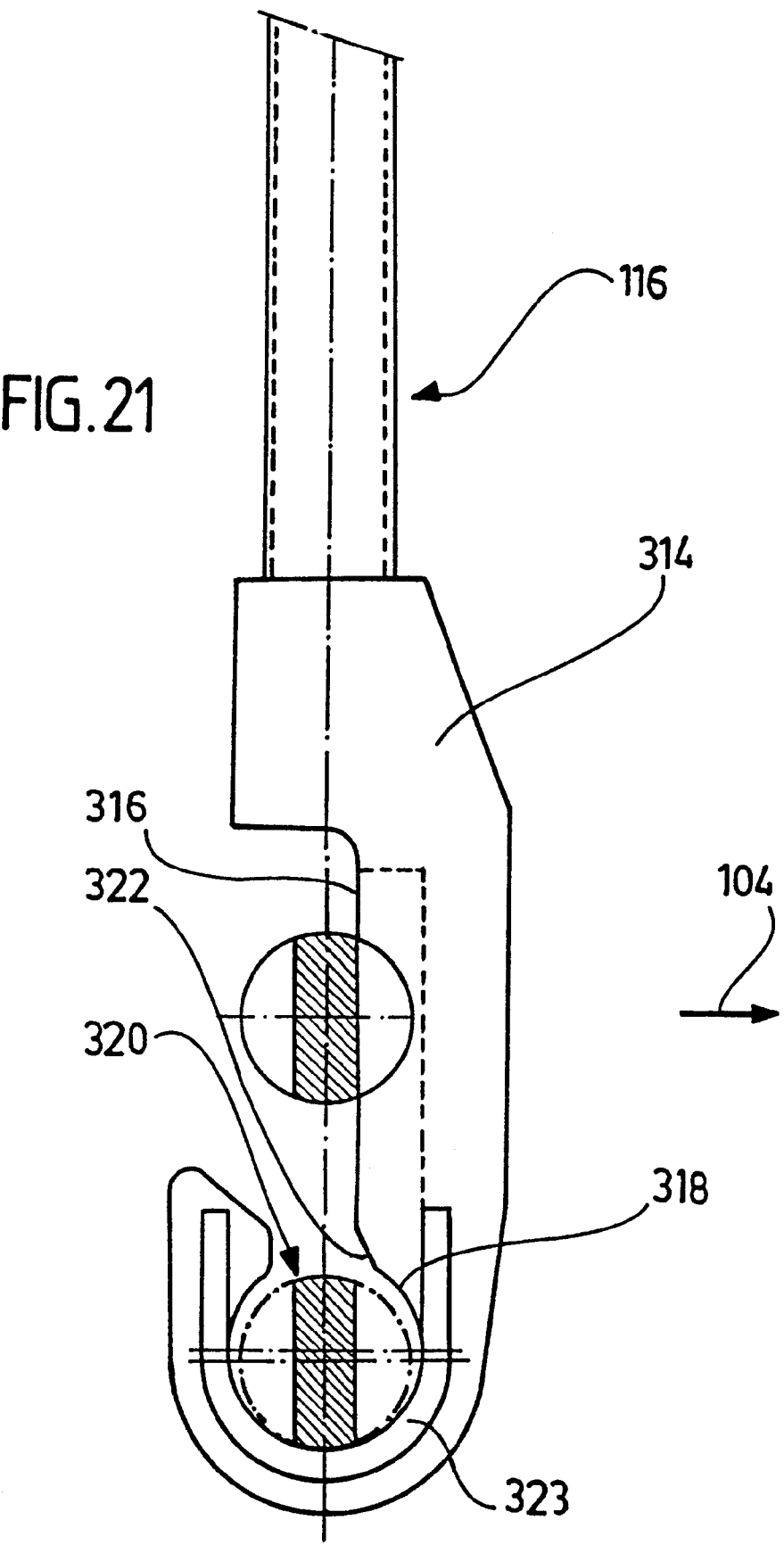
FIG. 21 shows a schematic side view of the pendulum from FIG. 20 and the suspension area of a skid frame suspended on the pendulum with a horizontal alignment of the skid frame.

As is apparent from FIGS. 20 and 21, each of the carrier hooks 314 of the pendulums 116 has a vertical stop surface 316 to the rear when seen in the direction of conveyance 104 and an arc-shaped carrier surface 318 which adjoins the stop surface 316 downwards, extends over an arc angle of approximately 310° and thus surrounds a receiving means 320 for one of the suspension pins 188 of the skid frame 108.

Driven by the roller conveyor 292 of the lifting station 114, the skid frame 108 carried on the lifting frame 268 moves more quickly forwards in the direction of conveyance 104 than the pendulums 116 of the pendulum conveyor 118. As a result, the suspension pins 188 of the skid frame 108 abut from behind on the vertical stop surface 316 of a respective carrier hook 314.

In the course of the lowering movement of the lifting frame 268 following this abutment, each suspension pin 188 moves along the stop surface 316 downwards through an entry opening 322 in the carrier surface 318 as far as into the receiving means 320 in the lower area of the carrier hook 314. If the respective suspension pin 188 reaches the lower end of the receiving means 320, it is seated with its lower, curved side surface 192 on a lower area of the carrier surface 318 and so the skid frame 108 is lifted away from the roller conveyor 292 of the lifting station 114 during further downward movement of the lifting frame 268 and is now supported solely by the carrier hooks 314 of the pendulums 116 of the pendulum conveyor 118 and is moved forwards with them along the direction of conveyance 104.

In the suspended state, the cylindrical sections 186 of the suspension areas 184 of the skid frame 108 rest on U-shaped reinforcement elements 323 arranged laterally on the carrier hooks 314.

The skid frame 108, suspended each time from four pendulums 116, is conveyed with the vehicle body 110 arranged thereon in a headfirst position through the horizontal inlet section 122 of the pendulum conveyor 116.

Figure 29:
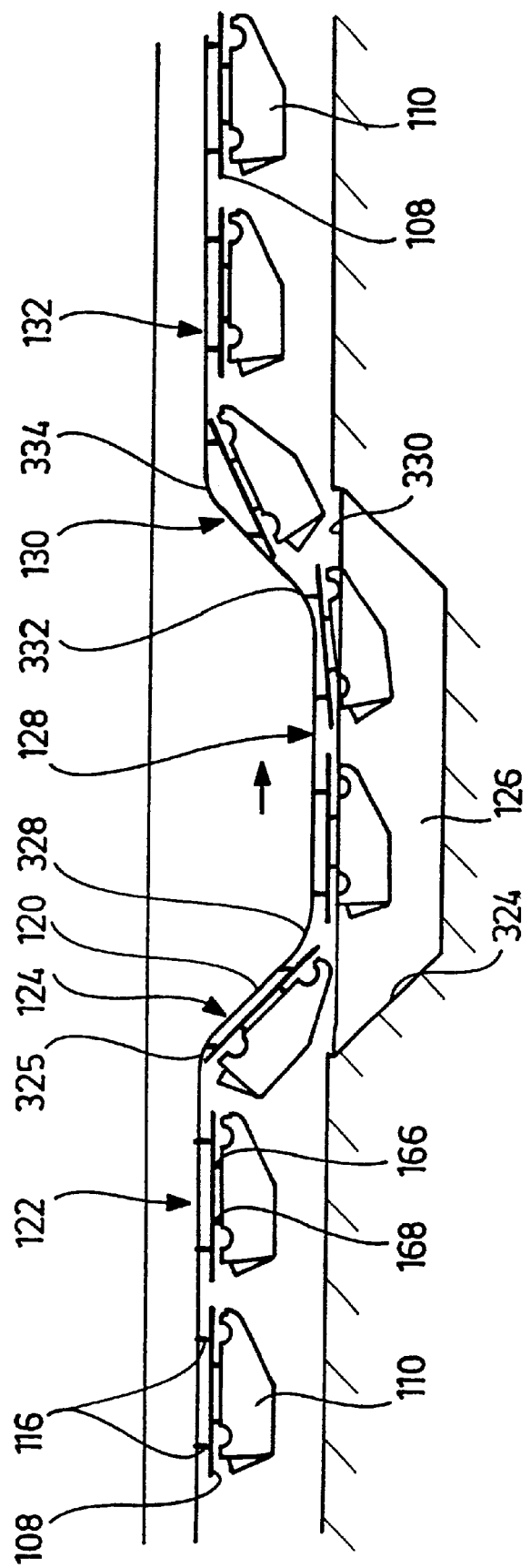
FIG. 29 shows a schematic side view of the pendulum conveyor and the treatment tank from FIG. 1.

The path of a vehicle body 110 arranged on a skid frame 108 in a headfirst position through the booth 123 is illustrated schematically in FIG. 29.

The horizontal inlet section 122 of the pendulum conveyor 116 merges via a vertical arc 325 into the immersion section 124, in which the conveyor means 120, with which the pendulums 116 are pivotally connected, is conveyed downwards at an angle of, for example, approximately 45° in relation to the horizontal.

An inclined inlet surface 324 of the treatment tank 126 is arranged under this inclined immersion section 124 of the pendulum conveyor 118. The inclination of the inclined inlet surface 324 is essentially the same as the inclination of the inclined immersion section 124 of the pendulum conveyor 118.

Since the front pendulums 116 in the direction of conveyance 104 are arranged lower than the rear pendulums 116 in the direction of conveyance during the transport through the inclined immersion section 124, the skid frame 108 suspended on the pendulums 116 turns relative to the pendulums 116, which are always aligned vertically, through an angle which corresponds to the angle of inclination of the immersion section 124 in relation to the horizontal, i.e., for example, through 45°.

Figure 22:
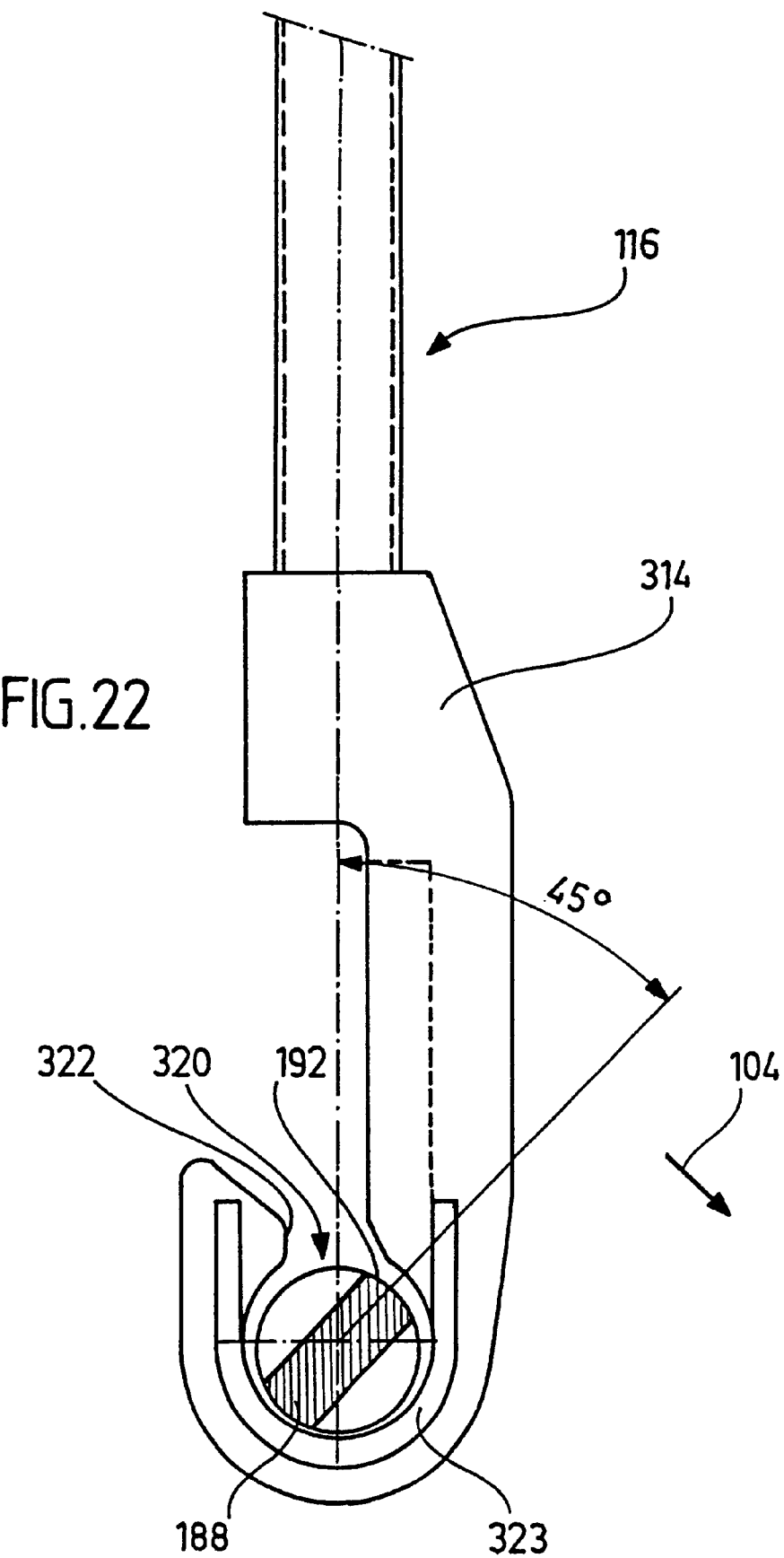
FIG. 22 shows a schematic side view of the pendulum from FIG. 20 and the suspension area of a skid frame suspended on the pendulum with an inclined alignment of the skid frame during the process of immersion into a treatment tank.

Therefore, the suspension pins 188 in the receiving means 320 of the carrier hooks 314 also turn through this angle, as illustrated in FIG. 22.

As a result, the upper, curved side surface 192 of the suspension pin 188 is no longer located beneath the entry opening 322 of the receiving means 320 on the carrier hook 314 during the transport through the inclined immersion section 124 but vertically beneath an area of the carrier surface 318 adjacent the entry opening 322. The suspension pin 188 can, therefore, no longer be moved out of the receiving means 320 of the carrier hook 314 due to a vertical movement. On the contrary, the suspension pin 188 abuts during a vertical upwards movement, for example, due to the vehicle body 110 swimming up during immersion in the treatment tank 126 on the upper area of the carrier surface 318 mentioned above which prevents any further lifting of the suspension pin 188 relative to the carrier hook 314 and thus any lifting out of the pendulum 116.

In order to shorten the immersion section and thus the required overall length of the treatment tank 126, a greater angle of inclination of the immersion section can also be provided, for example, 60°.

Since the vehicle body 110 is immersed in the treatment tank 126 in the headfirst position, it is ensured that the foremost window opening (windshield opening) of the vehicle body 110 is immersed in the treatment tank 126 at the same time or only shortly after the front side of the floor pan 173. Since the windshield opening and the additional window openings 174 offer the liquid in the treatment tank 126 a large entry cross section for penetrating the interior of the vehicle body 110, the immersion resistance, which the vehicle body 110 in the headfirst position offers to the liquid of the treatment tank 126, is considerably less than the immersion resistance which a vehicle body 110 in the standard position, i.e., with a floor pan 173 arranged beneath the window openings 174 would offer to the liquid of the treatment tank 126. When a vehicle body 110 is immersed in the treatment tank 126 in a standard position, the window openings 174 do not dip into the liquid until long after the floor pan 173 and so the immersion resistance is, in this case, determined decisively by the floor pan 173 of the vehicle body 110 which has only small entry cross sections for the liquid of the treatment tank 126.

As is apparent from FIG. 29, the inclined immersion section 124 of the pendulum conveyor 118 merges into the horizontal treatment tank section 128 via a vertical arc 328.

The vehicle body 110 is conveyed through this treatment tank section 128 in the headfirst position for the prescribed minimum immersion time, for example, three minutes. With a minimum immersion time of three minutes, the overall length of the treatment tank 126 is typically 16 meters.

As is apparent from FIG. 29, the vertical distance of the conveyor means 120 from the level 330 of the treatment tank and the length of the pendulums 116 are selected such that at the most the crossrails 166, 168 of the skid frame 108 but not its skid runners 142 dip into the treatment tank 126.

If the treatment tank 126 is a paint bath, for example, a cathodic dip painting bath, this measure prevents the skid runners 142 from being painted as well and so the skid runners 142 have to be cleaned only after a greater number of passes through the treatment device 100.

As a result of the fact that in the horizontal treatment tank section 128 the roof 176 of the vehicle body 110 hangs downwards, no air bubbles or foam from the interior of the vehicle body 110 can collect beneath the roof 176, as is often the case when a vehicle body is conveyed in a standard position through a treatment tank. On the contrary, such air bubbles and foam can, when a vehicle body 110 is conveyed in a headfirst position through the treatment tank 126, escape upwards out of the interior of the vehicle body 110 through outlet openings in the floor area of the vehicle body 110. As a result, it is possible to avoid parts of the vehicle body 110 not coming into contact with the liquid of the treatment tank 126 on account of air bubbles or foam and thus not being subjected to the desired treatment, i.e., for example, cleaned, degreased or painted.

Furthermore, the roof 176 and the hood 180 hang downwards when the vehicle body 110 is transported through the treatment tank section 128 in a headfirst position and so no dirt from the treatment tank 126 can be deposited on these particularly critical visible surfaces of the vehicle body 110. Treatment errors, for example, painting errors on account of sedimented dirt particles are thus avoided, in particular, on the extended horizontal visible surfaces of the vehicle body 110.

At the end of the treatment tank section 128, the same merges via an additional vertical arc 332 into the emerging section 130 which extends upwards at an angle of, for example, 45° in relation to the horizontal and is arranged over an inclined outlet surface 326 of the treatment tank 126 with essentially the same inclination.

As a result of the upward movement of the pendulums 116 in the emerging section 130, the vehicle body 110 is lifted out of the treatment tank 126 again.

Since the vehicle body 110 is in the headfirst position, the rear window openings 174 of the vehicle body 110 are the last to leave the treatment tank 126 and so the liquid in the interior of the vehicle body 110 can run out completely and free from markings through these large exit openings.

The inclined emerging section 130 of the pendulum conveyor 118 merges into the horizontal outlet section 132 via an additional vertical arc 334, the skid frame 108 being conveyed through the outlet section into the lifting station 134 on the exit side with the vehicle body 110 arranged on it in a headfirst position.

The lifting station 134 on the exit side is constructed in the same manner as the lifting station 114 on the entry side and reference is made in this respect to its description in the above.

In the lifting station 134 on the exit side, the skid frames 108 with the vehicle bodies 110 arranged on them in a headfirst position are lifted out of the pendulums 116 by lifting the lifting frame 268 and placed on the support rollers 284 of the roller conveyor 292 of the lifting station 134.

A skid frame 108 placed on the roller conveyor 292 of the lifting station 134 on the exit side is conveyed into the turning device 136 on the exit side by driving the support rollers 284 of this roller conveyor.

The turning device 136 on the exit side is constructed in the same way as the turning device 112 on the entry side and reference is made in this respect to its description in the above.

A skid frame 108 with vehicle body 110 arranged thereon, which has run with its skid runners 142 between the upper roller conveyor 222 and the lower roller conveyor 220 of the turning device 136 on the exit side, is locked on the turning frame 196 in the manner already described in the above by means of a clamping means 234 of the turning device 136. Subsequently, the vehicle body 110 is returned to the standard position by turning the turning frame 196 of the turning device 136 on the exit side through 180°.

Subsequently, the locking of the skid frame 108 on the turning frame 196 is released and the skid frame 108 with the body 110 arranged thereon is conveyed, by driving the lower roller conveyor 220, out of the turning device 136 on the exit side into the roller conveyor 140 on the exit side and from this to an additional treatment device or to an additional production section.

In a variation of the treatment device 100 illustrated in FIG. 30, the treatment tank 126 is of a considerably shorter design than in the embodiment described above and comprises apart from the inclined inlet surface 324, the inclination of which corresponds to the inclination of the immersion section 124, an inclined section 336 following it and having less of an inclination, a horizontal section 338 following this, an additional inclined section 340 which adjoins thereto and rises at the same angle in relation to the horizontal as the first inclined section 336 and an inclined outlet surface 326 adjoining thereto, the inclination of which corresponds to the inclination of the emerging section 130 of the pendulum conveyor 118.

The treatment tank 126 of this embodiment is designed such that it allows an immersion of all the areas of the vehicle body 110 in a headfirst position but not a longer dwelling time of the vehicle body 110 in the treatment tank 126.

The floor areas of the treatment tank 126 of this embodiment are adapted as much as possible to the paths followed by points on the roof 176 of the vehicle body 110; examples of such paths are, in FIG. 30, the path line 342 of a point on the front roof edge, the path line 344 of a point on the rear roof edge and the path line 346 of a point on the roof between the front roof edge and the rear roof edge.

The entirety of all the path lines of the points of the vehicle body 110 define together the immersion contour of the vehicle body 110, to which the floor of the treatment tank 126 must be adapted as well as possible in order to keep the volume of the treatment tank 126 as small as possible.

Since the vehicle body 110 is conveyed into the treatment tank 126 in a headfirst position, a considerably more favorable immersion contour results than in the case where the vehicle body is conveyed into the treatment tank in a standard position since the vehicle body 110 has a smaller longitudinal extension in the area of the window openings 174 and the roof 176 than in the area of the floor pan 173.

The treatment tank 126 can therefore be of a shorter design and have a smaller bath volume than in the case where the vehicle body is conveyed through the treatment tank in the standard position.

The way, in which the pendulums 116 are connected to the conveyor means 120 of the pendulum conveyor 118, and how the conveyor means 120 is constructed in detail will now be explained more exactly in the following on the basis of FIGS. 23 to 26.

Figure 23:
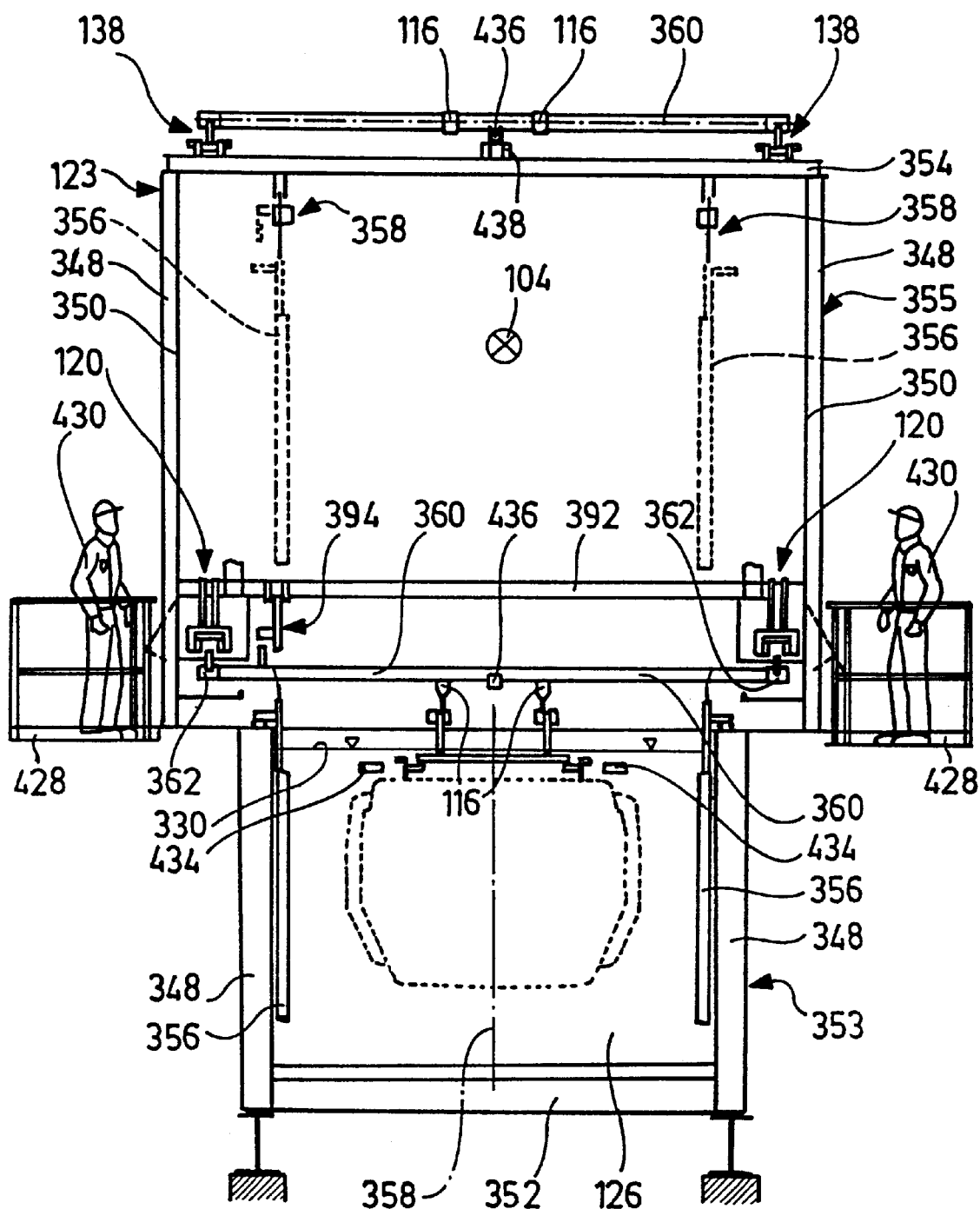
FIG. 23 shows a schematic cross section through a booth of a pendulum conveyor, through which the vehicle bodies are conveyed by means of a two-strand conveyor means, wherein the two strands of the conveyor means are arranged to the side next to and above the treatment tank.

FIG. 23 shows a cross section through the booth 123 of a pendulum conveyor 118 which has a two-strand conveyor means 120 in the area of the treatment tank section 128.

Figure 26:
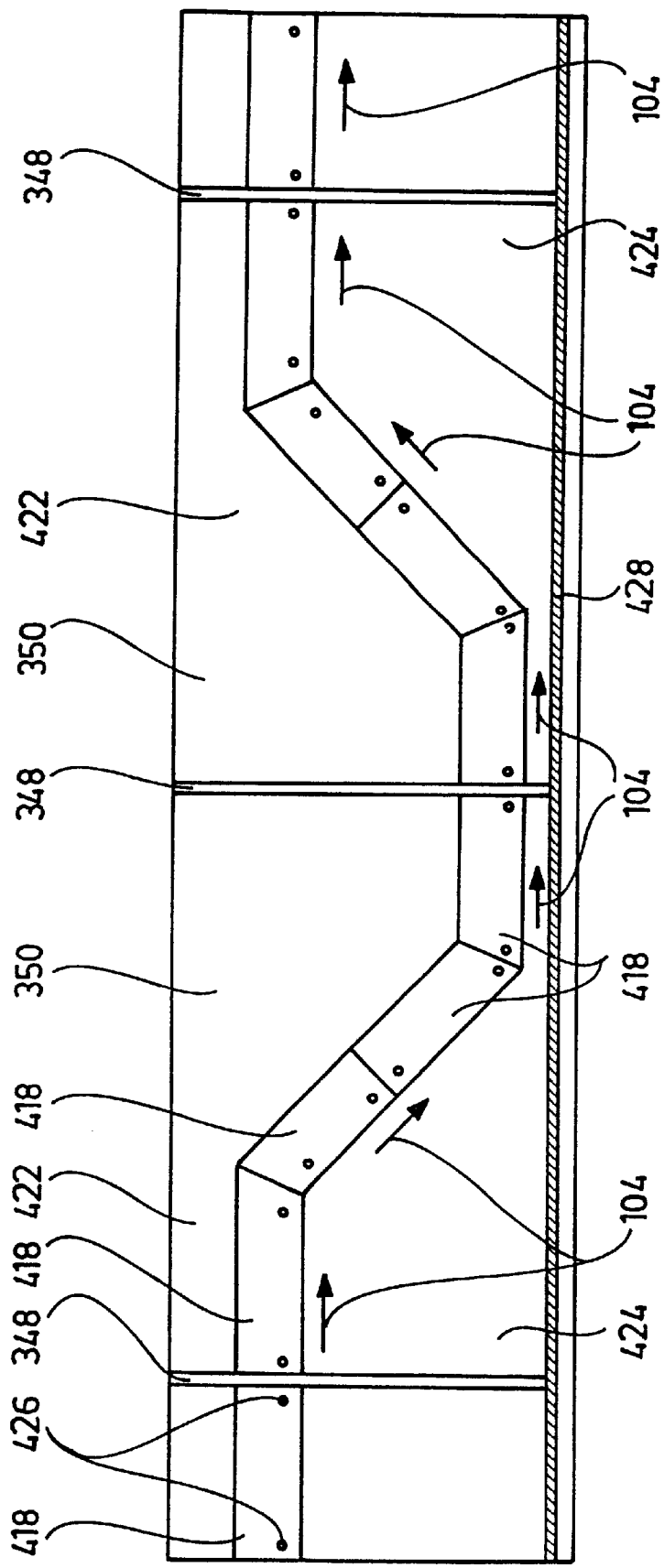
FIG. 26 shows a schematic side view of the booth from FIG. 23 with maintenance flaps arranged on the booth.

The booth 123 comprises vertical carrier supports 348, between which plane, vertical side walls 250 extend (cf. also FIG. 26). Furthermore, the booth 123 is closed downwards by a base wall 352 and upwards by a top wall 354.

The base wall 352 supports the treatment tank 126, the liquid level of which is designated as 330.

The treatment tank 126 is accommodated in a lower area 353 of the booth 123 which has a smaller width than the upper area 355 of the booth 123.

The base of the treatment tank 126 is inclined slightly in order to enable the tank liquid to flow away completely to a discharge opening for cleaning and maintenance purposes.

The treatment tank 126 illustrated in FIG. 23 is a cathodic dip painting bath. Anodes 356, which can be lifted out of the treatment tank 126 for maintenance purposes by means of chain hoists 358, are immersed in the treatment tank 126 along both longitudinal sides of the treatment tank 126. The lifted position of the anodes 356 is illustrated by broken lines in FIG. 23.

A vehicle body 110 suspended on a skid frame 108 in a headfirst position is immersed in the liquid bath 126.

The skid frame 108 is suspended in pendulums 116 of the pendulum conveyor 118 in the manner already described above.

Figure 24:
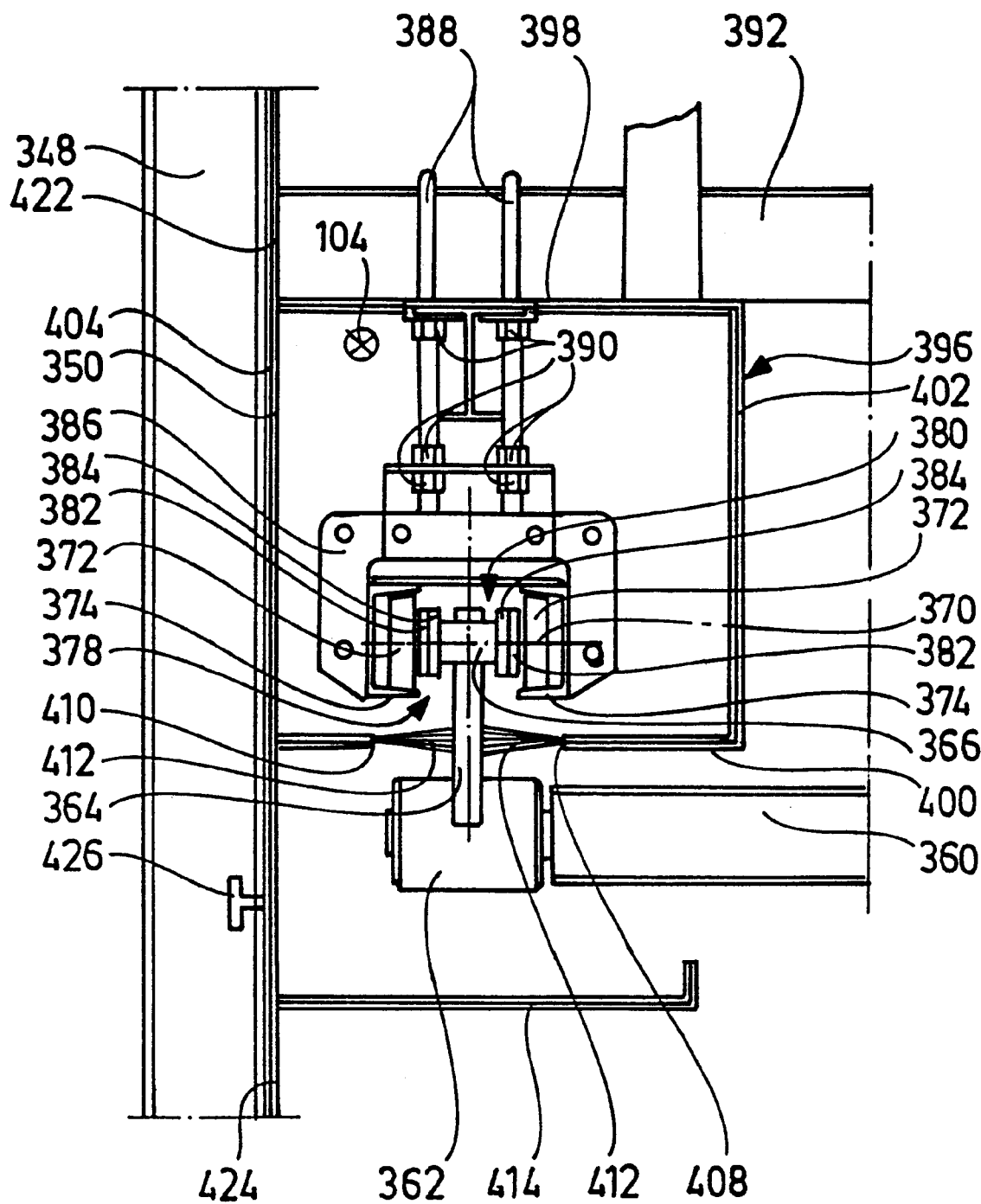
FIG. 24 shows a schematic cross section through a conveyor means channel of the pendulum conveyor from FIG. 23 with a maintenance flap in a closed state.

As is apparent from FIG. 23, two pendulums 116 arranged symmetrically to a central plane 358 of the booth 123 are secured each time to a common pendulum crossrail 360 which is pivotally mounted at its two ends on a respective bearing sleeve 362 (FIG. 24).

Each of the bearing sleeves 362 is held via a respective support bar 364 on a respective connecting member 366 which is rigidly connected to a conveyor chain 380 which is composed of inner chain side bars 382 and outer chain side bars 384 following one another in the direction of conveyance 104. The chain side bars 382 and 384 are arranged in respective pairs at a distance from one another transversely to the direction of conveyance 104. Chain side bars following one another along the direction of conveyance 104 are connected to one another so as to be articulatedly pivotable in a vertical plane so that the conveyor chain 380 can describe arcs in this vertical plane.

The connecting members 366 rigidly connected to the conveyor chain 380 are always aligned at right angles to the direction of conveyance 104; the pendulums 116 are also always aligned vertically in inclined conveyor sections on account of the pivotable mounting of the pendulum crossrails 360 on the bearing sleeves 362.

The two ends of each connecting member 366 projecting laterally beyond the chain side bars of the conveyor chain each support a guide roller 372.

The guide rollers 372 roll along the lower guide arms 374 of two profiled guide rails 376 which extend along the direction of conveyance 104 and have essentially C-shaped cross sections, the open sides of which face one another.

The two profiled guide rails 376 together form a chain guide path 378, along which the guide rollers 372, the connecting members 366 with the bearing sleeves 362 and the pendulums 116 pivotally mounted thereon move.

The movement of the guide rollers 372 is thereby brought about by the driven guide chain 380.

The two profiled guide rails 376 forming the chain guide path 378 are secured on suspension clamps 386 which follow one another at regular intervals along the direction of conveyance 104 and are each held by means of two threaded rods 388 and nuts 390 arranged thereon so as to be vertically adjustable on suspension crossrails 392 which extend through the booth 123 transversely to the direction of conveyance 104 between the vertical side walls 350.

Furthermore, contacting elements 394 (FIG. 23) are arranged on the suspension crossrails 392 and these elements are in electrical contact with the pendulum crossrails 360 in order to be able to adjust the pendulums 116 and thus the vehicle bodies 110 connected in an electrically conductive manner to the pendulums 116 via the skid frame 108 to the cathode potential required for the cathodic dip painting.

Figure 25:
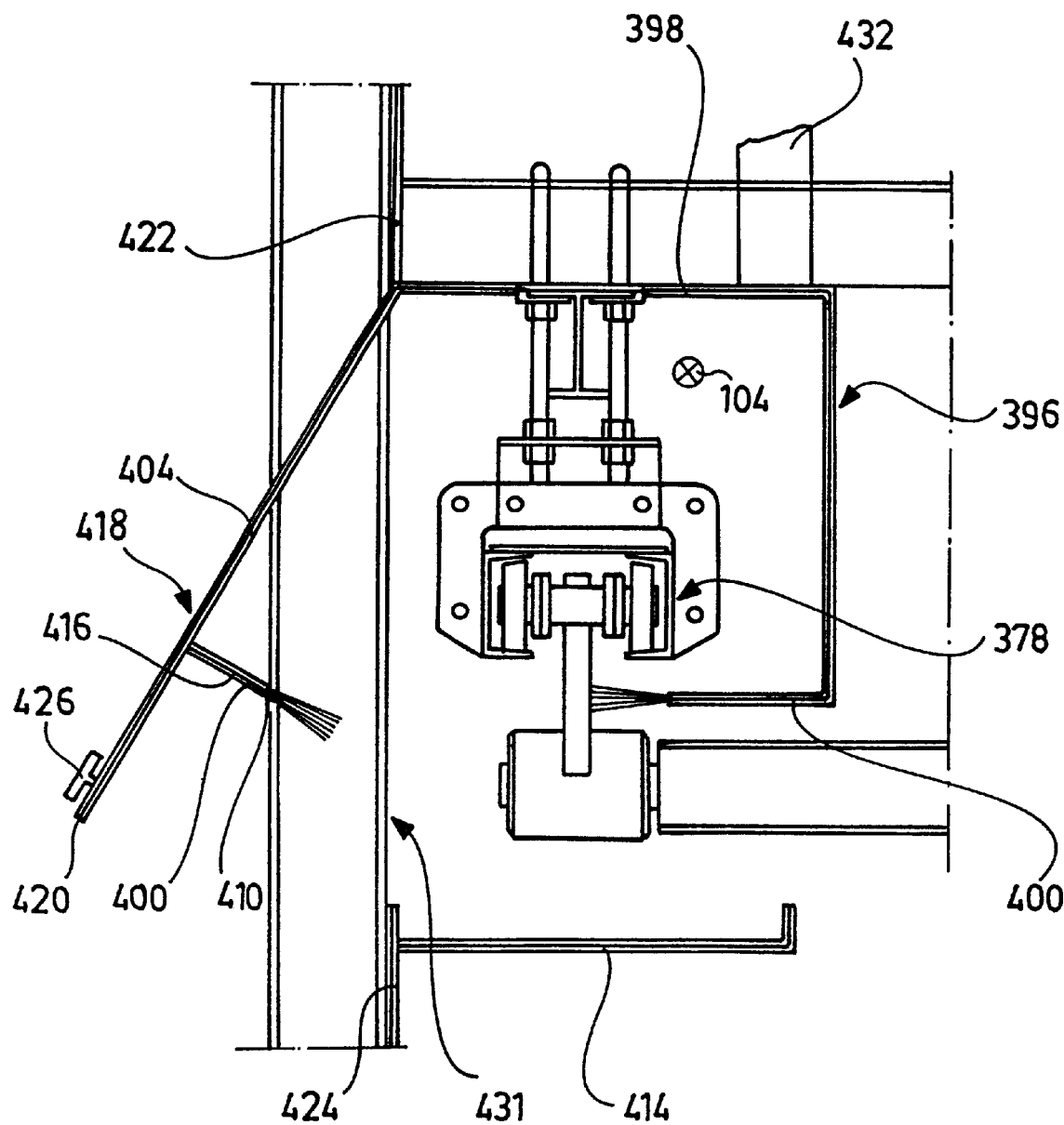
FIG. 25 shows a schematic cross section through a conveyor means channel of the pendulum conveyor from FIG. 23 with a maintenance flap in an opened state.

As is apparent, in particular, from FIGS. 24 and 25, each of the two chain guide paths 378 extends within a conveyor means channel 396 which has an essentially right-angled cross section and is limited upwards by a top wall 398, downwards by a base wall 400, towards the central plane 358 of the booth 123 by an inner side wall 402 and on the side located opposite the inner side wall 402 by an outer side wall 404.

In order to facilitate the passage of the support bars 364 downwards out of the conveyor means channel 396, the base wall 400 of the conveyor means channel 396 has a longitudinal slot 406, which extends along the direction of conveyance 104 and from the inner edge 408 of which and from the outer edge 410 of which respective brushes 412 extend towards the center of the longitudinal slot 406 in order to prevent dirt particles, for example, particles rubbed off from the conveyor chain 380 or the guide rollers 372 from passing from the interior of the conveyor means channel 396 into the interior of the booth 123.

In order to collect dirt particles passing through the longitudinal slot 406 despite the brushes 412, a dirt collecting tray 414 extending along the direction of conveyance 104 is arranged beneath the longitudinal slot 406 on the vertical side wall 350 of the booth 123.

As is best seen from FIG. 25, the outer side wall 404 of the conveyor means channel 396 and the area 416 of the base wall 400 of the conveyor means channel 396 arranged between the outer side wall 404 and the outer edge 410 of the longitudinal slot 406 form parts of a maintenance flap 418 which is held at the level of the top wall 398 of the conveyor means channel 396 by means of a hinge (not illustrated) so as to be pivotable about a horizontal pivot axis.

The maintenance flap 418 extends from the area 416 of the base wall 400 of the conveyor means channel 296 further downwards as far as a lower edge 420 arranged just above the dirt collecting tray 414.

The maintenance flap 418 forms part of the vertical side wall 350 of the booth 123 and in its closed state (illustrated in FIG. 24) is flush with an upper area 422 of the vertical side wall 350 which adjoins the maintenance flap 418 upwards and with a lower area 424 of the vertical side wall 350 which adjoins the maintenance flap 418 downwards.

As is best seen from FIG. 26, several maintenance flaps 418 adjoin one another along the direction of conveyance 104 and each of these extends along the direction of conveyance 104 over a length of approximately two meters. As a result, it is ensured that the weight of a single maintenance flap 418 is not too great to allow the maintenance flap 418 to be lifted manually by an operator. In order to be able to lift the maintenance flaps 418, each of them is provided with two actuating handles 426.

As is apparent from FIGS. 23 and 26, walkable maintenance catwalks 428 are arranged on the outer sides of the vertical side walls 350 of the booth 123 and operating personnel 430 can step onto them to reach the maintenance flaps 418.

As is apparent from FIG. 25, each maintenance flap 418 in the opened state provides access to a maintenance opening 431 in the vertical side wall 350 of the booth 123 and thus makes it possible to have free access to the interior of the respective conveyor means channel 396 in order to be able to carry out maintenance and cleaning work on the chain guide path 378 located in the conveyor means channel 396.

Furthermore, with a maintenance flap 418 open the brushes 412 can be cleaned or exchanged and the dirt collecting tray 414 can be emptied and cleaned.

In order to prevent aggressive chemical substances, for example, fluorides from penetrating the conveyor means channel 396 from the treatment tank 126, a supply of compressed air to the conveyor means channel 396 is provided and this comprises a compressed air supply pipe 432 opening in the top wall 398 of the conveyor means channel 396.

As a result of air supplied under overpressure via the compressed air supply pipe 432, the interior of the conveyor means channel 396 can be subjected to an increased pressure in comparison with the interior pressure of the booth 123 so that a continuous flow of air out of the conveyor means channel 396 through the longitudinal slot 406 into the interior of the booth 123 is generated which prevents aggressive chemical substances from penetrating the conveyor means channel 396 from the interior of the booth 123.

As a result, it is possible to manufacture the components arranged in the interior of the conveyor means channel 396, in particular, the chain guide path 378, the guide rollers 472 and the suspension clamps 386 from normal steel which need not have any particular resistance with respect to aggressive chemical substances.

As is apparent from FIG. 23, sill anodes 434, which are required to achieve an adequate coating thickness in the area of the floor pans 173 of the vehicle bodies 110 during the cathodic dip painting, are arranged in the treatment tank 126 just beneath the level 330 of the treatment tank on both sides of the central plane 358.

Since the vehicle bodies 110 are conveyed through the treatment tank 126 in a headfirst position, the sill anodes 434 can be arranged above the path of the vehicle bodies 110 close to the level 330 of the treatment tank where they are accessible for maintenance purposes without the liquid needing to be drained from the treatment tank 126.

As is apparent, furthermore, from FIG. 23, the return belt 138 of the conveyor means 120 of the pendulum conveyor 118 extends above the top wall 354 of the booth 123. The pendulum crossrails 360 are therefore conveyed back over the roof of the booth 123, wherein the pendulums 116 arranged on the pendulum crossrails 360 are transported in horizontal alignment and the pendulum crossrails 360 are supported with a respective, centrally arranged support roller 436 on a profiled support 438 extending in longitudinal direction of the roof of the booth 123.

Figure 27:
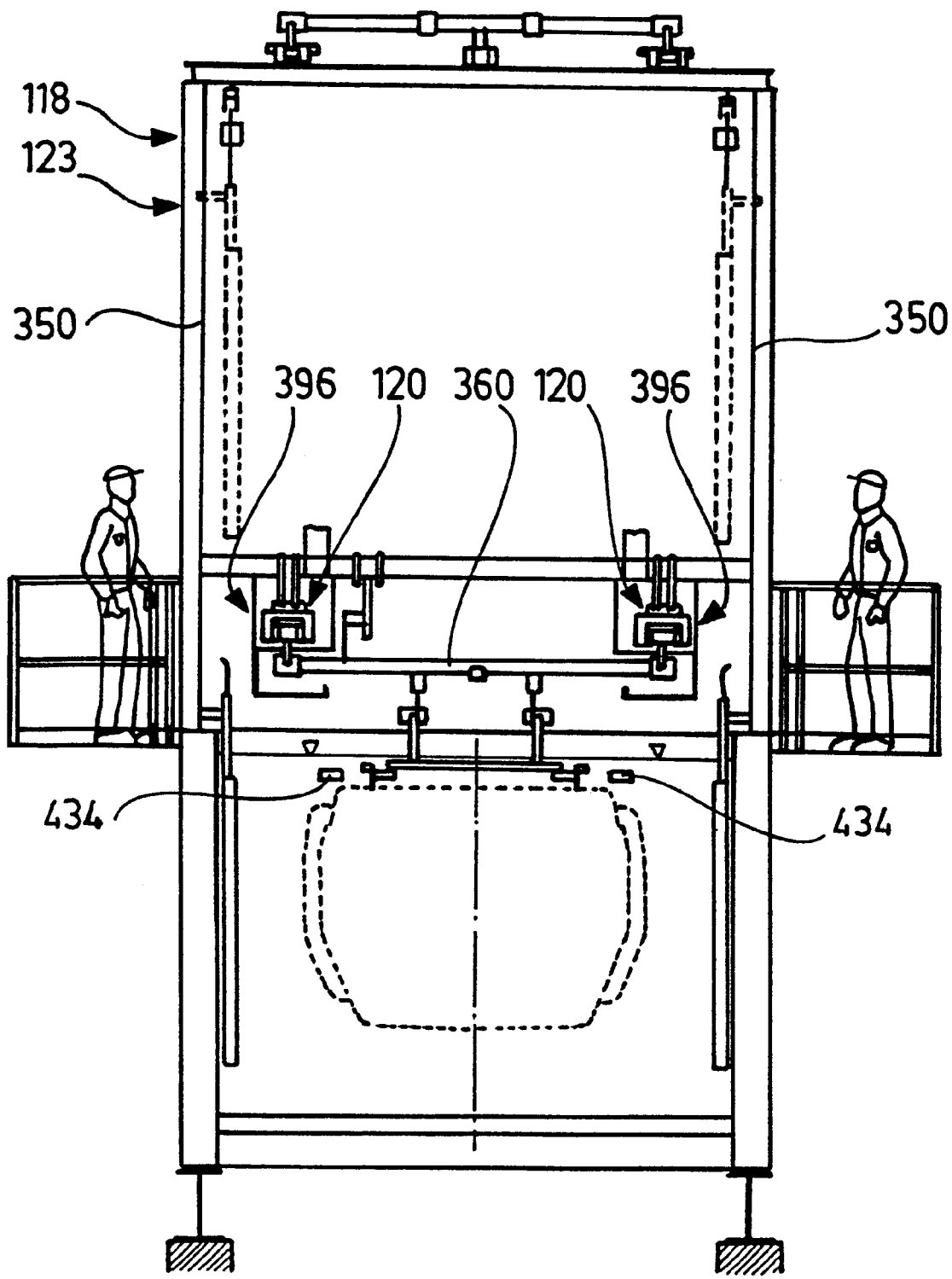
FIG. 27 shows a schematic cross section through a booth, through which the vehicle bodies are conveyed by means of a two-strand conveyor means, wherein the two strands of the conveyor means are arranged above the treatment tank.

An alternative embodiment of the pendulum conveyor 118 and the booth 123 illustrated in FIG. 27 differs from the embodiment described above and illustrated in FIGS. 23 to 26 in that the pendulum crossrails 360 of this embodiment are of a shorter design and so the two strands of the conveyor means 120 both extend over the treatment tank 126.

The two guide means channels 396 of this embodiment are arranged at a distance from the vertical side walls 350 of the booth 123 and so the interior of these conveyor means channels 396 is not accessible from the outer side of the booth 123.

The embodiment of the drier booth 123 illustrated in FIG. 27 is of a narrower construction in its part arranged above the treatment tank 126 than the embodiment illustrated in FIGS. 23 to 26; moreover, the vertical side walls 350 of the upper and the lower booth parts are flush with one another so that continuous side walls can be used over the entire height of the booth 123.

As for the rest, the alternative embodiment of the pendulum conveyor and the booth illustrated in FIG. 27 corresponds to the embodiment illustrated in FIGS. 23 to 26 with respect to construction and operation and reference is made in this respect to its description above.

Figure 28:
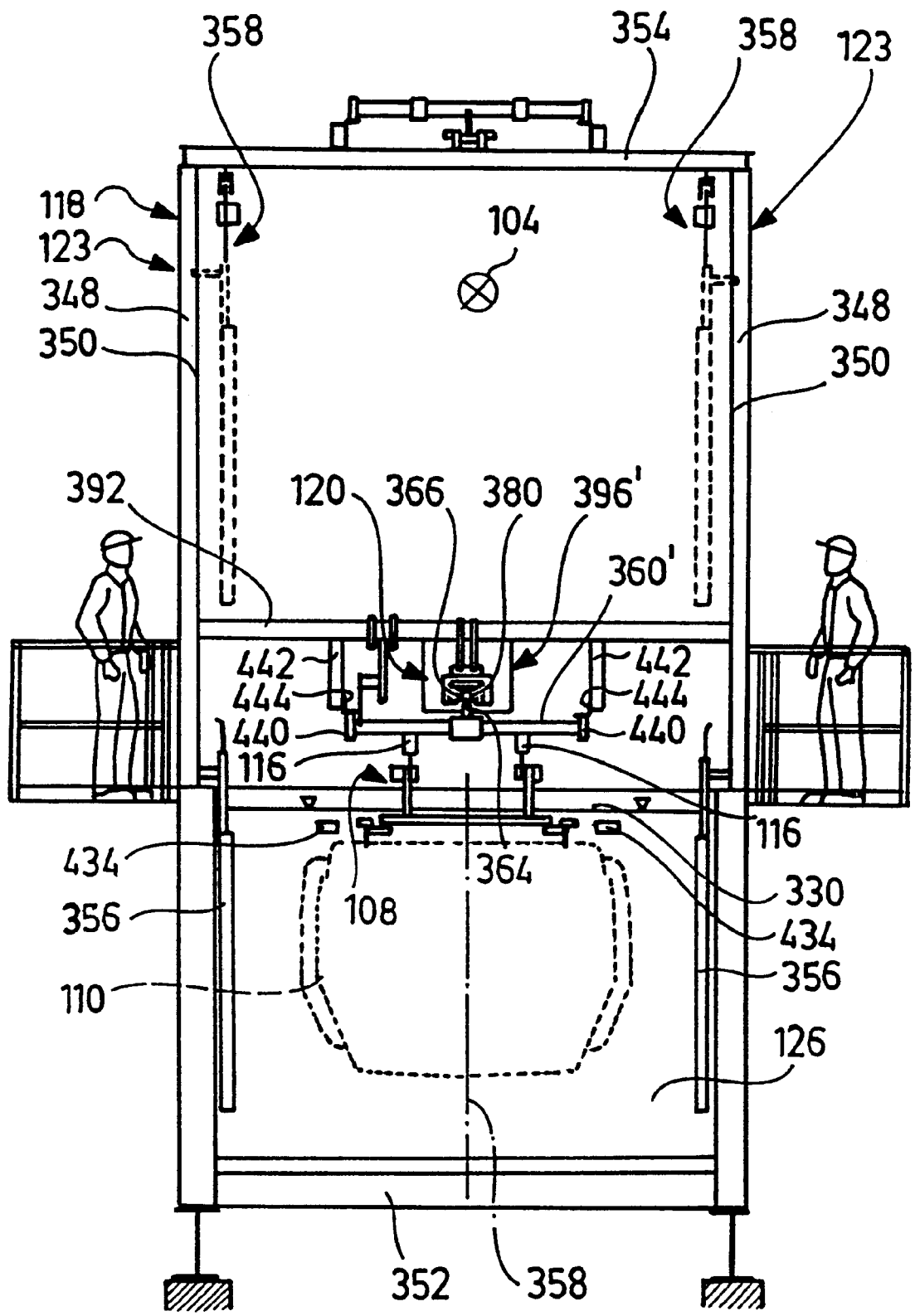
FIG. 28 shows a schematic cross section through a booth of the pendulum conveyor from FIG. 1, through which vehicle bodies are conveyed by means of a one-strand conveyor means.

A further, alternative embodiment of the pendulum conveyor 118 and the booth 123 illustrated in FIG. 28 differs from the embodiment illustrated in FIGS. 23 to 26 in that a one-strand conveyor means is used instead of a two-strand conveyor means 120.

The single conveyor chain 380 of this embodiment extends within a conveyor means channel 396' arranged centrally over the treatment tank 126.

A central bearing sleeve 362', in which a pendulum crossrail 360' is pivotally mounted, is held via a support bar 364 on the connecting member 366 of the conveyor chain 380. The two ends of the pendulum crossrail 360' are provided with guide rollers 440 which are guided on profiled angle guide rails 444 which extend parallel to the direction of conveyance 104 and are held on the suspension crossrails 392 via holders 442.

In this embodiment, as well, the upper and the lower areas of the vertical side walls 350 of the booth 123 are flush with one another, as in the embodiment illustrated in FIG. 27, as well, so that continuous side walls 350 can be used over the entire height of the booth 123.

As for the rest, the embodiment of the pendulum conveyor and the booth illustrated in FIG. 28 corresponds to the embodiment illustrated in FIGS. 23 to 26 with respect to construction and operation and reference is made in this respect to its description above.

What is claimed is:

1. A process for conveying vehicle bodies through a treatment tank for the surface treatment of the vehicle bodies, wherein:
   prior to their introduction into the treatment tank the vehicle bodies are transferred from a standard position, where window openings of the respective vehicle body are arranged above a floor pan of the vehicle body, into a headfirst position, where the window openings of the respective vehicle body are arranged beneath said floor pan; and
   the vehicle bodies are subsequently introduced into the treatment tank, conveyed through the treatment tank along a substantially horizontal conveyance direction suspended from pendulums of a pendulum conveyor, and brought out of the treatment tank in the headfirst position.

2. A process as defined in claim 1, wherein the vehicle bodies are transferred back into the standard position after they have been brought out of the treatment tank.

3. A process as defined in claim 1, wherein in said headfirst position the windshield openings of the vehicle bodies point forwards in the direction of conveyance.

4. A process as defined in claim 1, wherein the vehicle bodies are transferred from the standard position into the headfirst position by means of a rotation through approximately 180°.

5. A process as defined in claim 4, wherein the vehicle bodies are transferred from the standard position into the headfirst position by means of a rotation about an axis of rotation aligned essentially at right angles to the direction of conveyance.

6. A process as defined in claim 1, wherein the vehicle bodies are arranged on skid frames, said skid frames being suspended from said pendulums.

7. A process as defined in claim 6, wherein the skid frames are arranged above the vehicle bodies in the headfirst position.

8. A process as defined in claim 6, wherein skid frames are used with skid runners, each skid runner having two contact surfaces facing away from one another for supporting the skid frame on an essentially flat supporting surface of a roller conveyor.

9. A process as defined in claim 8, wherein:
   a turning device is used to transfer the vehicle bodies from the standard position into the headfirst position; and
   both contact surfaces of the skid runners abut on a respective, essentially flat supporting surface of the turning device.

10. A process as defined in claim 9, wherein at least one supporting surface of the turning device is designed as a common tangential plane of the support members of the support rollers of a roller conveyor.

11. A process as defined in claim 10, wherein both supporting surfaces of the turning device are designed as common tangential planes of the support members of the support rollers of a respective roller conveyor.

12. A process as defined claim 6, wherein skid runners of the skid frames are conveyed over the treatment tank above a level of the treatment tank.

13. A process as defined in claim 1, wherein the vehicle bodies are suspended from said pendulums in the headfirst position.

14. A process as defined in claim 1, wherein said pendulums are arranged completely above the vehicle bodies suspended on the pendulums.

15. A process as defined in claim 1, wherein said pendulums are conveyed over the treatment tank above a level of the treatment tank.

16. A process as defined in claim 1, wherein said pendulums are conveyed by means of a one-strand conveyor means.

17. A process as defined in claim 1, wherein said pendulums are conveyed by means of a two-strand conveyor means.

18. A process as defined in claim 17, wherein guideways for the conveyor means are arranged over the treatment tank.

19. A process as defined in claim 17, wherein guideways for the conveyor means are arranged above the treatment tank and to a side next to the treatment tank.

20. A process as defined in claim 17, wherein each strand of the conveyor means is arranged in a respective, closed conveyor means channel.

21. A process as defined in claim 20, wherein the interior of the conveyor means channel is maintained at an increased air pressure in comparison with the interior of a booth containing the treatment tank.

22. A process as defined in claim 1, wherein:
   the treatment tank is an electrophoretic paint bath; and
   sill anodes arranged above a path of the vehicle bodies are used in the treatment tank.

23. A conveyor device for conveying vehicle bodies through a treatment tank for the surface treatment of the vehicle bodies, comprising a pendulum conveyor for introducing the vehicle bodies into the treatment tank, conveying them through the treatment tank and bringing them out of the treatment tank again, wherein:
   the conveyor device comprises a transfer device for transferring the vehicle bodies prior to their introduction into the treatment tank from a standard position, where window openings of the respective vehicle body are arranged above a floor pan of the vehicle body, into a headfirst position, where the window openings of the respective vehicle body are arranged beneath said floor pan; and
   said conveyor subsequently introduces the vehicle bodies into the treatment tank, conveys them through the treatment tank along a substantially horizontal conveyance direction suspended from pendulums of the pendulum conveyor, and brings them out of the treatment tank in the headfirst position.

24. A conveyor device as defined in claim 23, wherein the conveyor device comprises an additional transfer device for transferring the vehicle bodies back into the standard position after they have been brought out of the treatment tank.

25. A conveyor device as defined in claim 23, wherein the transfer device transfers the vehicle bodies into a headfirst position where the windshield openings of the vehicle bodies point forwards in the direction of conveyance.

26. A conveyor device as defined claim 23, wherein the transfer device comprises a turning device.

27. A conveyor device as defined in claim 26, wherein the turning device has an axis of rotation aligned essentially at right angles to the direction of conveyance.

28. A conveyor device as defined in claim 23, wherein the vehicle bodies are arranged on skid frames, said skid frames being suspended from said pendulums.

29. A conveyor device as defined in claim 28, wherein the skid frames are arranged above the vehicle bodies in the headfirst position.

30. A conveyor device as defined in claim 28, wherein the skid frames comprise skid runners each having two contact surfaces facing away from one another, for supporting the skid frame on an essentially flat supporting surface of a roller conveyor.

31. A conveyor device as defined in claim 30, wherein the transfer device comprises a turning device having a first supporting surface and a second supporting surface, the skid runners of the skid frames abutting on said surfaces with a respective one of their contact surfaces during the transfer of the vehicle bodies from the standard position into the headfirst position.

32. A conveyor device as defined in claim 31, wherein the turning device comprises at least one roller conveyor, the support member apex lines of said roller conveyor defining one of the supporting surfaces of the turning device.

33. A conveyor device as defined in claim 32, wherein the turning device comprises two roller conveyors, the support member apex lines of said roller conveyors defining the supporting surfaces of the turning device.

34. A conveyor device as defined in claim 28, wherein skid runners of the skid frames are conveyed over the treatment tank above a level of the treatment tank.

35. A conveyor device as defined in claim 23, wherein the conveyor device comprises a transfer station where the vehicle bodies are suspended from said pendulums in said headfirst position.

36. A conveyor device as defined in claim 23, wherein said pendulums are arranged completely above the vehicle bodies suspended on the pendulums.

37. A conveyor device as defined in claim 23, wherein the pendulums are conveyed over the treatment tank above a level of the treatment tank.

38. A conveyor device as defined in claim 23, wherein the pendulum conveyor comprises a one-strand conveyor means.

39. A conveyor device as defined in claim 23, wherein the pendulum conveyor comprises a two-strand conveyor means.

40. A conveyor device as defined in claim 39, wherein the pendulum conveyor comprises guideways for the conveyor means arranged over the treatment tank.

41. A conveyor device as defined in claim 39, wherein the pendulum conveyor comprises guideways for the conveyor means arranged above the treatment tank and to the side next to it.

42. A conveyor device as defined in claim 39, wherein each strand of the conveyor means is arranged in a respective, closed conveyor means channel.

43. A conveyor device as defined in claim 42, wherein the interior of the conveyor means channel is maintained at an increased air pressure in comparison with the interior of a booth containing the treatment tank.

44. A conveyor device as defined in claim 23, wherein:
the treatment tank is designed as an electrophoretic paint bath; and
sill anodes are arranged in the treatment tank above a path of the vehicle bodies.

45. A treatment device for the surface treatment of vehicle bodies, comprising a treatment tank for the surface treatment of the vehicle bodies and a conveyor device as defined in claim 23.

* * * * *